(12) United States Patent
Koepke

(10) Patent No.: US 9,661,462 B2
(45) Date of Patent: May 23, 2017

(54) LOCATION-BASED DIGITAL MEDIA PLATFORM

(71) Applicant: SAPIENT CORPORATION, Boston, MA (US)

(72) Inventor: Gary Koepke, Carlisle, MA (US)

(73) Assignee: SAPIENT CORPORATION, Boston, MA (US)

(*) Notice: Subject to any disclaimer, the term of this patent is extended or adjusted under 35 U.S.C. 154(b) by 8 days.

(21) Appl. No.: 14/187,083

(22) Filed: Feb. 21, 2014

(65) Prior Publication Data

US 2015/0237473 A1 Aug. 20, 2015

Related U.S. Application Data

(60) Provisional application No. 61/940,236, filed on Feb. 14, 2014.

(51) Int. Cl.
*H04W 24/00* (2009.01)
*H04W 4/02* (2009.01)

(52) U.S. Cl.
CPC .................. *H04W 4/021* (2013.01)

(58) Field of Classification Search
CPC ...... H04L 63/10; H04W 4/008; G06Q 20/123
USPC ........... 455/456.3; 705/59, 52, 14.45, 14.23; 370/255; 715/720; 345/441, 634; 348/333.02
See application file for complete search history.

(56) References Cited

U.S. PATENT DOCUMENTS

| | | |
|---|---|---|
| 8,326,315 B2 | 12/2012 | Phillips et al. |
| 2010/0076818 A1* | 3/2010 | Peterson ............ G06Q 30/0245 705/59 |
| 2010/0146091 A1 | 6/2010 | Curtis et al. |
| 2010/0149399 A1* | 6/2010 | Mukai ................. G01C 21/20 348/333.02 |
| 2011/0050706 A1* | 3/2011 | Cherna .................. G06T 11/60 345/441 |
| 2012/0129553 A1 | 5/2012 | Phillips et al. |
| 2012/0225672 A1 | 9/2012 | Tholkes et al. |
| 2013/0060623 A1 | 3/2013 | Walker et al. |
| 2013/0060626 A1 | 3/2013 | Walker et al. |

(Continued)

FOREIGN PATENT DOCUMENTS

WO   WO-2013/035046   3/2003

OTHER PUBLICATIONS

Hard Hill Media. (2014) "DropKloud," located at <http://www.dropkloud.com>. (1 page).

(Continued)

*Primary Examiner* — Kiet Doan
(74) *Attorney, Agent, or Firm* — Morrison & Foerster LLP

(57) ABSTRACT

A digital media platform that enables content to be mapped to the context of location. The platform can allow users to create, view and share packages of multimedia content (drops) that are posted to points on a digital map. It enables the aggregation and re-publishing of open source content to fixed points on the map, for easier discovery and sharing. The platform can also provide a relevance engine that takes account of actions related to the creation and consumption of digital multimedia packages on a map, and can provide an ad serving system that takes advantage of behavioral and location-specific data to rank associations between consumers, content and places on the map.

12 Claims, 34 Drawing Sheets

(56) References Cited

U.S. PATENT DOCUMENTS

| | | | |
|---|---|---|---|
| 2013/0060635 A1 | 3/2013 | Walker et al. | |
| 2013/0060636 A1 | 3/2013 | Walker et al. | |
| 2013/0060637 A1 | 3/2013 | Walker et al. | |
| 2013/0066821 A1 | 3/2013 | Moore et al. | |
| 2013/0073422 A1 | 3/2013 | Moore et al. | |
| 2013/0212130 A1 | 8/2013 | Rahnama | |
| 2013/0225206 A1 | 8/2013 | Shuman et al. | |
| 2013/0339891 A1 | 12/2013 | Blumenberg et al. | |
| 2014/0129942 A1* | 5/2014 | Rathod | H04N 21/44222 715/720 |
| 2015/0168159 A1* | 6/2015 | Chao | G01C 21/30 701/428 |

OTHER PUBLICATIONS

The Echo Nest. "We Know Music . . . ," located at <http://echonest.com/> visited on Jun. 4, 2014. (2 pages).
The Echo Nest. "Power of our Platform," located at <http://echonest.com/solutions/> visited on Jun. 4, 2014. (1 page).
Findery. "About Findery," located at <https://findery.com/about> visited on Jun. 4, 2014. (3 pages).
Findery. "Frequently Asked Questions," located at <https://findery.com/faq> visited on Jun. 4, 2014. (11 pages).
Findery. "What is Findery," located at <https://findery.com/> visited on Jun. 4, 2014. (6 pages).
Kafka, P. (Aug. 29, 2013) "Foursquare Says It's Ready to Impress You Now," located at <http://allthingsd.com/?p=3545848&ak_action=printable>, (2 pages).
Groundspeak, Inc. "Geocaching 101," located at <http://www.geocaching.com/guide/> visited on Jun. 4, 2014. (6 pages).
Groundspeak Inc. "Geocaching—The OfficialGlobal GPS Cache Hunt Site," located at <http://www.geocaching.com/> visited on Jun. 4, 2014. ( 1 page).
MyCityWay Inc. (2013) "About Us," located at <http://www.mycityway.com/about> visited on Jun. 4, 2014. (4 pages).
MyCityWay Inc. (2013) "Get MyCityWay App Now!," located at <http://www.mycityway.com/overview> visited on Jun. 4, 2014. (4 pages).
MyCityWay Inc. (2013) "MyCityWay," located at <http://www.mycityway.com/index> visited on Jun. 4, 2014. (3 pages).
Groundspeak Inc. (2014) "Geocaching for Beginners" located at <http://www.geocaching.com/articles/Brochures/EN/EN_Geocaching_BROCHURE.pdf> visited Jun. 4, 2014. (2 pages).
International Search Report and Written Opinion mailed Aug. 18, 2014, directed towards International Application No. PCT/US2014/017833; 10 pages.

* cited by examiner

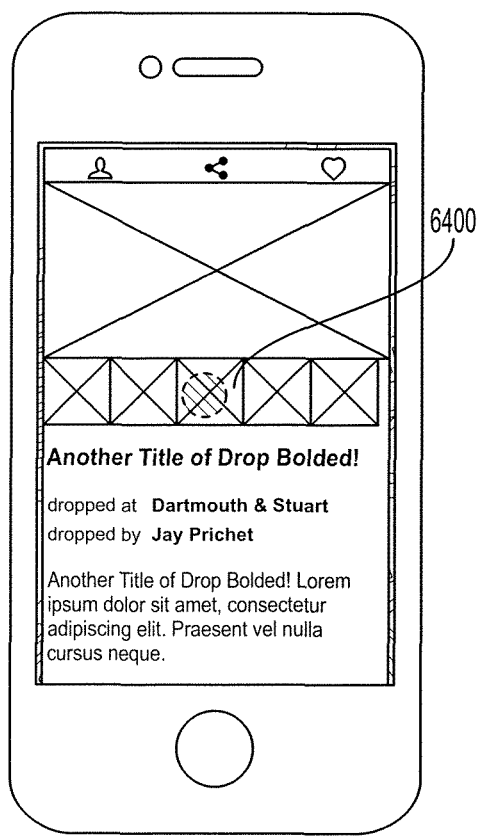
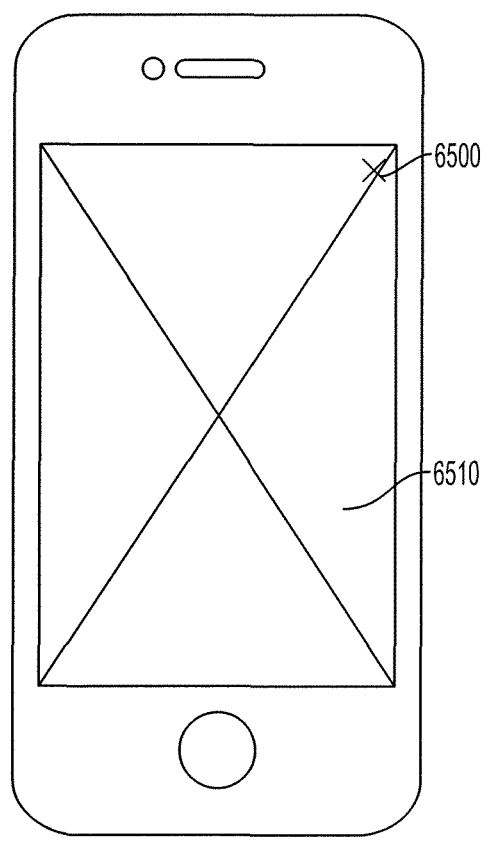
FIG. 64                    FIG. 65

LOCATION-BASED DIGITAL MEDIA PLATFORM

CROSS REFERENCE TO RELATED APPLICATIONS

This application claims the benefit of U.S. Provisional Patent Application No. 61/940,236, filed Feb. 14, 2014, the entirety of which is incorporated herein by reference.

FIELD OF THE DISCLOSURE

This relates a digital media platform that enables content to be mapped to the context of location.

BACKGROUND

One of the undisputed significant apps of the smartphone era is the map application. It is ubiquitous, popular, simple, incredibly accurate and essentially useful. And yet in all the time that it has been available it has yet to evolve beyond the basic utility of providing location and directions.

SUMMARY

The platform of the present disclosure, also referred to as "Dropcast," introduces a new dimension in mobile location, by mining and refining compellingly engaging content, and serving it up in a context-relevant way to users' current or selected locations. Dropcast is targeted towards making the map come alive using music, videos, personal stories, etc.

For example, Dropcast can use music, video, personal stories and images to unlock the soul of places. It allows creating and discovering location related content. This non-locked content can be viewed by anyone in the world by navigating the map.

Dropcast can also benefit from a complex and proprietary algorithm, which takes location, time, proximity, popularity, and social relationships to surface relevant content to the mobile app user. Dropcast can place single pieces of content in one location or many locations at once, to be discovered by people based on the relevance of that content to their interests.

Dropcast can allow companies and brands to publish time locked and geo-fenced content. A consumer would need to be in close proximity to the geo-fence and/or within the time boundaries to open and benefit from the content. One example where this can be used is to draw consumers to a store in a particular location on Saturday morning to open a special coupon or other content.

In other words, Dropcast provides location-based content—context for the information that is based on where the information matters most. Dropcast comprises a digital media platform that enables publishers to define the character of places by mapping content to the context of location. The key word here is 'context,' which in the digital realm translates to tags and metadata—the cloud of identifiers, adjectives and qualifying terms that attach to items residing in databases, such as Place Names, Author Names, Artist Names and Song Titles, for example.

In one embodiment in which content makers comprise artists, the Dropcast platform can be engineered to connect Place Names to Artist Names and Music Track IDs—and in due course much more besides. Either a User makes the connection when posting a drop (via a mobile app or a desktop publishing interface), or the back-end system makes the connection by 'scraping' textual entries on sites like Facebook and cross-indexing between tags that are associated with both Place Names and Artist Names. The more frequent the association to these common denominators, the higher the ranking of the contextual relevance between the Artist Name and the Place Name.

Once a Place Name and an Artist Name have been matched in this fashion, the system can search for related content on open databases and auto-generate drops. The system can take the name of a Music Track and extract the metadata and post a link to the track on a 3rd party media player such as rDio or Spotify, so that the track will play without the music file being stored on Dropcast's servers. When another End User opens his/her app and plays the music track in the drop, the app can intelligently search the track on the End User's preferred media player—not necessarily the one that the Author of the Drop sourced the track from.

Independently of the End User or the Author of the drop, the contextual value of each drop can be stored in the system and used to rank the drops against other drops that compete for exposure in the app. Together with Relevancy to a User's taste profile, and weights such as sponsorship endorsement or Popularity rankings, the system can calculate which drops a User would find most relevant, and surface those in the map UI rather than less relevant ones, which remain 'submerged' unless a User changes his/her Profile preferences or Searches for specific drops by name of Artist or Author, for example.

The same relevancy engine can be used to make recommendations to publishers and advertisers. Publishers can be recommended items of content to place in location, and locations to place content in, based on similarity of attributes and cross-indexing of tags. Brands and networks can serve ads against the tags attached to the drops, and the system can report on consumption patterns by analyzing usage by time, location and user profiles. A platform such as SapientNitro's Ionos platform can perform the ad serving function.

The Dropcast system can include a Geo-Publishing Interface (GPI) that connects brands to consumers through entertainment. It can allow brands to target their stories to consumers by location, age and relevance. Consumers can discover the music and entertainment they love when and where they are. The GPI can comprise a desktop content management system that gives content and advertising partners the ability to create, edit, publish and track their drops.

The Dropcast system can also include a mobile application designed for mobile operating systems such as iOS and Android that allows users to view content accessible through locations on the map. Users can discover drops by browsing the map, happening upon a location or having a drop shared with them by a member of their social network. Users can also create drops using the application to share with their social network. That share can be filtered from private to public.

DETAILED DESCRIPTION

Figure 1:
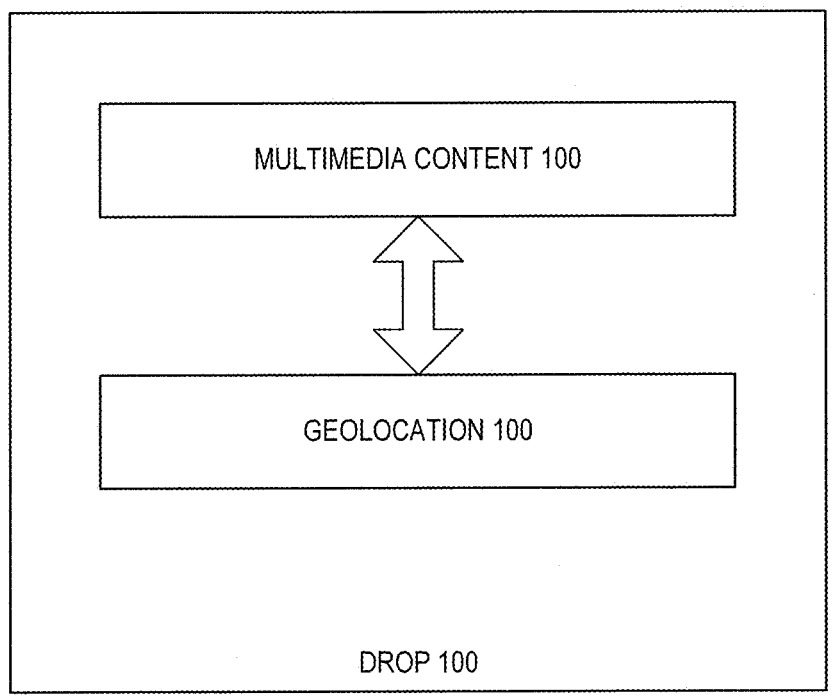
FIG. 1 illustrates an example of a drop in a location-based digital media platform.

The present disclosure is directed to a digital media platform ("Dropcast") that enables content to be mapped to the context of location. Although the embodiments disclosed herein describe a digital media platform in the context of a server, mobile client and publishing client, the digital media platform is not so limited and can take any architectural form in accordance with the teachings of the present disclosure. For example, the functionality of the mobile client and publishing client can be provided on the same type of computing device (e.g., laptop, tablet, smartphone).

Generally speaking, the audiences for Dropcast can be defined as follows:

1. Brands—advertisers that are sponsors of content
2. Artists—content partners that are presenting content through the app/platform
3. Consumers—users who are visiting drops, consuming the content in the drops and acting on the brand advertising/messaging
4. Creators—users who are creating their own drops within the system and sharing with their friends via Dropcast and other social networks
5. Agencies—organizations that work on the behalf of brands to set up and maintain advertisements within Dropcast
6. Technology organizations—groups that use our API or receive our syndicated data With respect to what Dropcast can commit to others (users/brands/others) to provide or do:

Dropcast can be a media property, similar to a magazine/content website/application Dropcast can present advertisements, messages and linking opportunities for advertisers to consumers/users based on several targeting methods (location, demographic, relevance to user interest, shared brand attribute)

Dropcast can present content provided by artists to users

Dropcast can allow users to 'bring their own access' to music files (Dropcast does not need to compete with iTunes or Spotify; rather, it allows links to music hosted on various music services to be played through its application)

Dropcast can give advertisers and artists the opportunity to sell merchandise, tickets and promotional discounts Dropcast can produce promotional campaigns for advertisers and artists Dropcast can link to or provide e-commerce storefronts for advertisers and artists Dropcast can work with outside agencies (including SapientNitro) to produce, place and traffic advertisements Dropcast can supply analytic support to advertisers and artists Dropcast can allow users to share drops with their social networks and through the Dropcast Map Dropcast can allow users to re-drop drops similar to retweeting tweets Dropcast can engage a relevance algorithm to enhance the experience of recommending drops to users Dropcast can work with technology partners to provide mapping, ad serving and other services that are not core to Dropcast operations Dropcast can work with Content Partners to provide inclusion opportunities and creation assistance for developing drops.

Dropcast can work with Advertising Partners to craft media units and metrics that help them connect to consumers Drop can work with Agency Partners to craft means for them to resell Dropcast to their clients and fulfill on those placements Dropcast can present to Consumers a delightful and meaningful way to relate the world they are in with the world they live in online In return, Advertising Partners can be expected to provide/do:

purchase ad space and sponsorship space within the map application manage their own drops with our guidance provide advertisements for trafficking within the system manage their account and login information Advertising Partners, Brand Sponsors, and Agency Partners can pay for placement of advertisements and sponsorships within Dropcast.

Users can have free access to Dropcast and have ads presented to them.

Content providers can provide access to their content with or without fee depending on the agreements they hold with drop.

Commerce entities can utilize Dropcast to surface e-commerce storefronts and share a percentage of the sale.

As a result, the goal of Dropcast is:

to provide a Geo-Publishing Interface that allows brands to introduce their stories and relevant content to consumers using location and time to create a viable media property that can present millions of ads daily around the world to share the content placed on drop across social networks to become a necessary vehicle for brands, content providers and users to communicate The following provides an overview of exemplary features of the present disclosure.

Regarding drops, Dropcast can allow users to create, view and share packages of multimedia content (drops) that are posted to points on a digital map. As shown in FIG. 1, drop 100 can comprise multimedia content 100 placed at geolocation 100 on a digital map. Multimedia content 100 can comprise at least four content types (user generated and/or existing): text, photos, videos, and audio files. The platform can permit users to combine the at least four content types in a drop. Each type of content can be, for example, (1) linked to, uploaded or copied and pasted from the Web, (2) produced by the user by typing text, taking photos or videos, or making a recording, or (3) uploaded from users' personal computers or corporate network servers. Users can include hyperlinks in their texts if desired. They can also add as many photos, videos and audio files as desired up to a pre-established number.

With the platform general users can employ a mobile app to create drops on their mobile devices, post drops to the map, open and view drops posted by others, and share drops through their other social media sites. Dropcast can effectively turn the planet into a communications, publishing, marketing, and social sharing platform.

Social media features integrated into the app can include the ability to comment on drops and follow and be followed by other Dropcast users. Users can also integrate Dropcast with their music streaming services so that music can be played and shared within drops. Augmented reality features in Dropcast can allow users to see content floating in the space before them, visible via their mobile devices, Google glasses or similar devices. User journeys can be described via sequences of drops called "Droplines," which can be refined and targeted by using tags such as "music genre" or "travel photography."

For the first time, users can post complete multimedia packages to a map to be discovered, viewed, and shared. They can create this content themselves or collect it from other sources for inclusion in a drop. Brands and other organizations can use Dropcast to post locally relevant content that serves a marketing function. They can create entire marketing campaigns around this global platform. Similarly, publishers of all kinds can use Dropcast to distribute locally relevant content, and a variety of other businesses and other organizations (such as tourism firms, game design companies, and nonprofit, government and political groups) can target their audiences precisely where they are located.

Entirely new kinds of businesses can be expected to emerge to take advantage of Dropcast—memorial designers, for example, or walking tour companies that lead customers from drop to drop. Augmented reality integrated into the platform will permit users to seem to physically travel through a world that is visibly annotated at every point of interest, enriching their experience by providing layers of content relevant to every place they visit.

Thus, Dropcast can allow users to:
  Create packages of content that may include text, images, videos and audio and attach them to a digital map.
  Open and view packages of this kind on a digital map.
  Share packages of this kind to other social media sites.
  Comment on content within the packages.
  Follow other users of the platform in order to see packages of this kind that they have attached to the map.
  Integrate music streaming services into packages of this kind.
  Use augmented reality features in packages of this kind.
  Include video in a content package to be attached to a map.
  Include personally recorded audio in a content package to be attached to a map.
  Track user behavior creating and opening packages of this kind, and use keywords to track user behavior related to particular interests or attributes.

Figure 2:
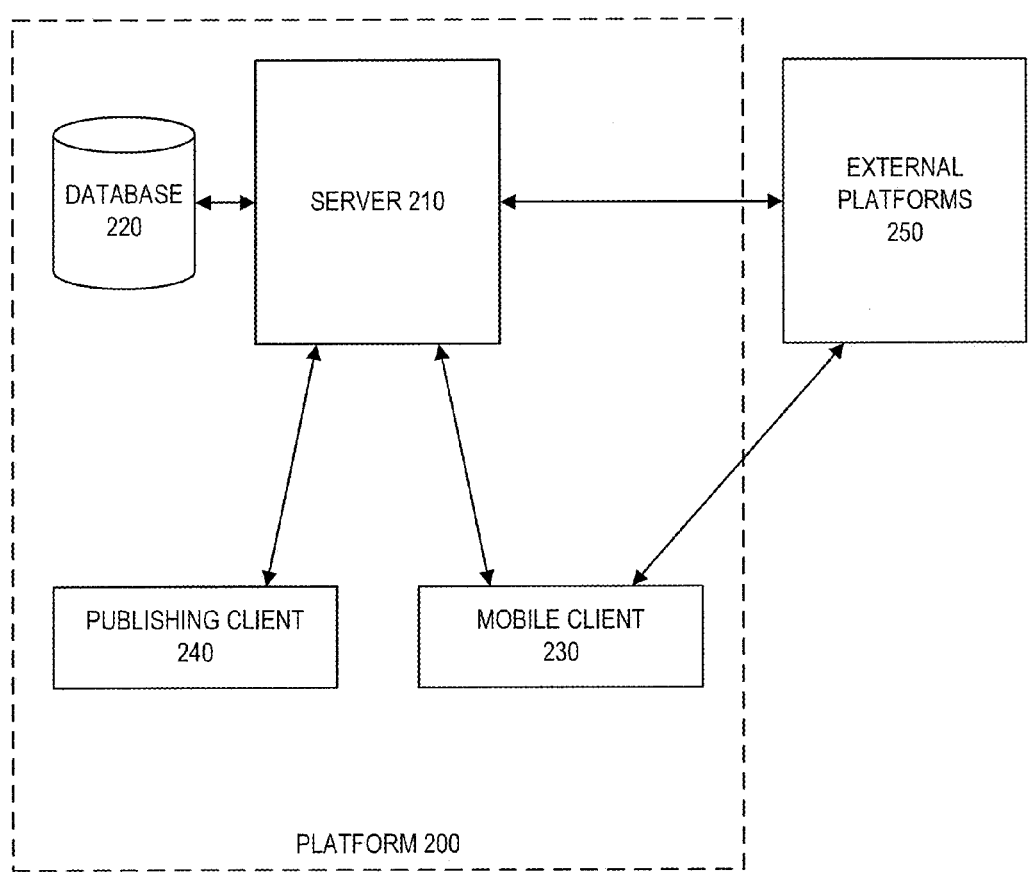
FIG. 2 illustrates an example of a location-based digital media platform architecture.

FIG. 2 illustrates an example of a location-based digital media platform architecture. In the illustrated embodiment platform 200 comprises server 210, mobile client 230 and publishing client 240 coupled to each other across a network (not shown). Server 210 can be coupled to database 220 which can store any suitable information in connection with drops 100. Server 210 and mobile client 230 can interface with external platforms 250, such as social network sites, across a network.

For example, mobile client 230 (also referred to as "app") can comprise a mobile device app such as an iPhone app and/or an Android phone app. Publishing client 240 can comprise a geo-publishing interface ("GPI")—a web interface for publishers. Server 210 can comprise one or more servers including, for example, a consumer website and backend API (e.g., PHP code with JSON output) built specifically for Dropcast. The backend can run on any suitable stack such as a LAMP stack (Linux—Apache—MySQL—PHP) and the site can be hosted in any suitable manner such as on a web service such as Amazon web services ("AWS"). The user facing apps (mobile client 230 and publishing client 240) can access the backend using a Dropcast API which can return in any suitable format such as JSON. The API can access internal Dropcast database 220. In addition, it can reach out to an API of external platforms 250 to enable map, search, video, music search and play functionality.

Drops can combine precise location information (latitude+longitude) provided by device/hardware and or place name or address provided by 3rd party look up services (e.g., Google Places) and consumable media of several formats including simple text, photographic imagery, video or audio.

Consumable media can be associated to the location via a user work flow and later consumable on mobile or desktop platforms depending on media type and source.

Figure 3:
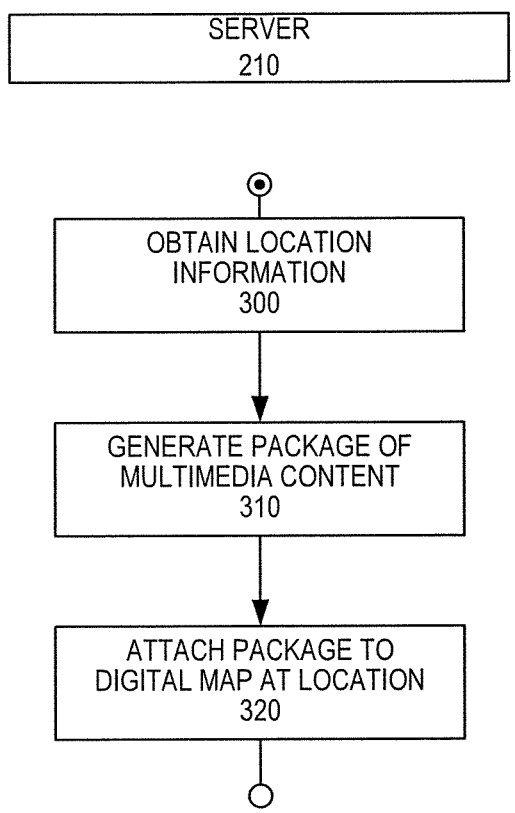
FIG. 3 illustrates an example of a drop creation process in location-based digital media platform.

Media types can include content created by Drop users, such as taking a photo, video or recording an audio track with the hardware provided by mobile devices. Native platform specific code can access exposed APIs that allow users to capture and record this data. As shown in FIG. 3, native code can take the saved content and push this binary information to Drop's remote servers (block 300) for indefinite storage, at which time the remote servers can record the relationship between the uploaded content (block 310) and the specific location information (block 320).

Native mobile platform code can also pull metadata from existing music tracks on the device or by searching exposed service APIs of streaming services such as RDIO, Soundcloud and/or Spotify to identify streamable versions of these songs for users with subscriptions to these services. This Drop content with metadata can be directly associated to a location provided by the device.

Native code can proxy search requests through the Dropcast server onto video search providers, such as YouTube. The resulting information can be stored as references to those URIs that can then be associated to a location and returned as a combined Drop entity.

A database schema for database 220 can comprise the following elements:
  "Authentication_Channels"—can store all authentication channels that a user can authenticate through. The identified channels can be, for example, drop, google, facebook, twitter, etc.
  "Content_Makers"—can represent all content makers who contribute to the making of content. A maker can be defined as an entity who can contribute to one or many contents.
  "Content_Properties"—can comprise a key-value table used to store content specific properties as scalable open format controlled by the application.
  "Content_Tags"—can store the tag vector of content.
  "Contents"—can store core content metadata such as content type (video, audio, image, text), the title and whether this is content that belongs to an ad. An "is active" flag can be used globally to represent soft delete.
  "Drop_Contents"—since a drop can have one or more contents and some contents may present in many drops, this table can associate this relationship.
  "Drop_Tags"—can store the tag vector of a drop.
  "Drops"—the main table in the whole schema. It can be used to store the actual drop attributes such as the author, title, popularity, how many times shared, favored and a link to contents and location.
  "Entity"—can describe the top level body within the database. It can be something that can perform or be referenced by an action. If an entity performs an action, then it can be a user.

"Entity_Properties"—can comprise a key-value table used to store entity specific properties as scalable open format controlled by the application.

"Location_Properties"—can comprise a key-value table used to store location specific properties as scalable open format controlled by the application.

"Location_Tags"—can store the tag vector of a location.

"Locations"—this table can mainly store the geolocation identification parameters such as latitude and longitude of a drop.

"Providers"—table that can store the content providers of content through a given resource.

"Resources"—this can comprise an association table to represent an instance of content and a provider within a specific resource.

"Tags"—this table can store the master tag set.

"User_Authentications"—for each authentication instance made by a user, it can be stored here including the user and the authentication method with the used/generated token (internal and external).

"User_Content_Actions"—table can be used as a journal to record all activities made by a user against content.

"User_Drop_Actions"—partitioned table can be used as a journal to record all activities made by a user against a drop. It can also be used also to calculate drop popularity.

"User_drop_comments"—can store all comments made by users against a drop.

"User_drop_favorites"—can store all favorites made by users against a drop.

"User_followers"—each user's followers and all users that a user follows can be stored in this table (bi-directional).

"User_tags"—can store the tag vector of a user:

"Users"—can store application user credentials such as username and password.

"Metadata_event_actions"—all tables start by metadata keyword can be used internally by background processes or events such as popularity calculation daemon. This table can contain metadata about when an event was last run and other such data.

"Metadata_popularity"—can declare the metadata table which can comprise a key/value pair table that holds data used in calculating popularity values for drops.

"User_drop_action_aggregates"—the user drop actions aggregate table can contain the aggregate data of user drop actions that will be retained even after some user drop actions data has been dropped due to database size limitations.

Regarding drops viewable by map navigation, the platform can provide a digital map that shows drops placed in the user's immediate area. Upon opening a map, the user can see, for example, (1) drops placed by himself or herself, (2) drops placed by other users whom the user follows, and (3) drops placed by users of the Geo-Publishing Interface (GPI—as explained below) up to a certain number. When the map is opened, it can expand or narrow automatically to show multiple drops, at which point the user can further expand or narrow the map as desired. Drops placed in the same location can be clustered, and the number of clustered drops can appear on the drop icon. When a map displays a small number of drops or no drops, the user can be shown drops chosen by a relevancy algorithm as explained below.

The user can open a drop by tapping on a drop icon on the map. When the user taps on a cluster drop icon, the most recently created drop can display, and all other drops can be viewed by swiping through them up to a certain number. When not all clustered drops can be displayed, they can be chosen by the relevancy algorithm.

The map can display drops that may interest the user most—e.g., his or her own drops, drops created by friends and other people who interest the user, and drops likely to interest or educate the user when in a new location (such as when traveling to another country). The map can also display GPI drops that give the user an opportunity to learn about brands and other organizations that produce locally relevant content. This combination of drops can deliver a valuable local resource, alerting users to the experiences of people they follow, guiding them through new places they visit, and presenting commercial opportunities presented in a locally relevant context.

Thus, Dropcast can allow users to:

(a) View content attached to a map that is restricted to the user's content, content produced by people the user follows, and content created by users of a publishing system designed just for this type of content, up to a pre-established number.

Use a relevancy algorithm to display content on a map that is most likely to interest the user when (1) an insignificant number of pieces of content of type (a) appears, or (2) so many pieces of content of type (a) appear that the map would be cluttered.

Show content on a map that is posted in the same location by displaying an icon that shows the number of pieces of content in the cluster.

Display all pieces of content in a cluster up to a pre-established number, and allow the user to view these pieces of content by swiping through them and open them if desired.

Use a relevancy algorithm to select clustered pieces of content when there are too many to display.

In particular, native code can access the Location services available through API calls in the mobile operating system platforms (e.g., IOS and/or Android). This access can provide location via latitude and longitude, best guess at precision of that location and events when the information changes.

Based on a user's location as provided by IP geo-location or hardware GPS chips, a request can be made to the Drop server which can define a bounding box of viewable area—e.g., center point defined by latitude and longitude as well as outward radius defined by scale of current map view in meters.

Any drop determined to be within this bounding box can be returned as a structured data set including title, description, author and all of its associated content—be that track references on RDIO, Spotify, Soundcloud or YouTube URLs or links to uploaded user generated content, for example.

Native code can react to events of user touch and drag or changes in the GPS location. Once a change has been captured, additional requests for new drops can be made with the now changed information representing the new bounding box of visible map area, repeating prior steps.

As a user moves through the physical space the view can be refreshed with drops that are visible in the newly viewable area using the above steps.

As a user pans or zooms around the map, drops can be returned to fill any changes in the viewable area using the above steps.

Where multiple drops overlap, a user interface convention can be used to show a group with the number of overlapped items. The native code on each platform can determine the overlap based on latitude and longitude proximity as well as current visible scale.

Regarding geo-fenced and time-fenced content, Dropcast users can view drops placed far away from their location simply by widening the map. However, Dropcast can permit the creation of geo-fenced content that can be accessed only when the user physically enters the perimeter around a certain location. This can happen in at least two ways: (1) a geo-fenced drop is invisible on the map until the user actually enters within the fence, or (2) content within a drop remains invisible until the user comes within the permitted area.

This feature can open the way for many different commercial and noncommercial applications. For example, a retail store might post a drop that contains special offers that can be viewed only when a user nears the store or a hosted event. Alternatively, an athlete might create a geo-fenced drop that becomes visible when users visit the location of his/her practice sessions.

Time-fenced drops can operate similarly to geo-fenced ones, with the configurable element being time instead of space. Drops created through the GPI can frequently be time-fenced, as they can often be created for marketing campaigns with a temporal dimension. That is, Dropcast can permit the buying and selling of time/space blocks on the map much like TV airtime is currently bought and sold. Brands and other organizations can purchase access to time-fenced spatial coordinates through the GPI tool, for example, in order to mount marketing campaigns organized around events and delivered through drops. Publishers can also choose to time-fence Dropcast content created via the GPI if the content will be relevant and useful only for a particular length of time.

The platform's geo-fencing feature can permit brick-and-mortar stores, event organizers and other users to give rewards and other incentives—in the form of a drop or content within a drop—to users who come in physical proximity of their location or event. For brands, music labels, publishers and other organizations, the platform can also allow them to mount time-fenced marketing and publishing campaigns that deliver time-sensitive information or relate to particular events. In effect, Dropcast can invent a whole new form of salable media based on spatial and temporal coordinates.

Thus, Dropcast can allow users to:
Make a multimedia package of content posted to a digital map remain invisible until a user enters a certain perimeter, whereupon the user may open and share it.
Make content within a multimedia package posted to a digital map remain invisible until a user enters a certain perimeter, whereupon the user may see and share the additional content.
Permit time-fencing of a multimedia package of content posted to a digital map.
Turn the planet into a publishing and marketing medium that allows the buying and selling of time-space blocks for the distribution of multimedia packages of content posted to a digital map.
Use augmented reality features in this sort of activity.

In particular, native code can access the current location, a bounding box can be determined around that location using a configurable radius and, if the user's latitude and longitude are within the bounding box, the remote drop server can return the full data set. Otherwise it can return only summary information.

If a Drop is stored with a time fenced designation, it cannot be opened until a specific time. Any request for the details of a drop prior to this time, as determined by the server the request is reaching, can respond with only summary information for example. Once the start-time has been reached by the server, all requests for the details of this drop can return in full until the end-time captured for this drop content.

Regarding locking and unlocking drops, the platform can open the way for a new type of place-based experience by permitting an action taken in one drop to reveal previously locked content on the network. For example, a user can open a drop that asks him or her to perform an action—sharing the drop, for example, or clicking through to a website—in order to see drops that had previously been invisible. This "unlocking" of previously unseen Dropcast content can be used for a variety of purposes, including digital games, scavenger hunts, and marketing and educational initiatives that require users to take a series of steps to learn something new, receive a reward, or arrive at a destination. Unlocking of Dropcast content combines movement through locations with the fun of the hunt. The experience can become even richer with augmented reality allowing users to seem to physically proceed from one drop to another as new drops open up before them.

For the first time, users can explore their world by performing actions in one location that open up new possibilities for learning, entertainment or action in other locations. The planet can become richer in content as users work to unlock drops. This can usher in a whole new form of digital gaming and provide new ways to inform, educate and entertain users. Marketers and publishers can have a compelling new tool for engaging their audiences, and educators can add an experiential dimension to their teaching that promises to boost interest, speed learning and improve retention.

Thus, Dropcast can allow users to:
Require users to perform certain activities within existing packages of multimedia content posted on a digital map to make additional packages visible on the map.
Use augmented reality in this sort of activity.

In particular, the platform can flag a 'locked' drop using a lock in the database. Any locked drops can be unlocked by a variety of activities, such as sharing with a certain number of friends (e.g., 5) on an external platform (e.g., Facebook), creating a certain number of drops (e.g., 10), favoriting a certain number of drops (e.g., 5), commenting on a certain number of drops (e.g., 2), etc. These are only examples. The mobile app can prevent a user from seeing or opening a drop if that drop is locked. Once the user has satisfied a requirement, this drop can be viewable on a map or opened.

Regarding GPI publishing, the Geo-Publishing Interface can comprise a tool that allows users to place drops on the map from a desktop. From one location, a user can create one or more drops, choose their locations and affix them to points on the Dropcast map, either permanently or for a period of time. Locations can be identified in at least four different ways: (1) clicking on the map, (2) searching for an address, (3) searching for a place name, and/or (4) receiving recommendations by entering tags.

The GPI can allow users to create, edit and place drops in batch mode—so that, for example, a record label can place multiple drops about a band's tour to the map, with each drop different only in the name of the venue and the date of the concert. The GPI makes it easy to edit and delete drops after they have been created. It can also place identical drops up to a pre-established number.

The GPI can gives brands and other organizations a powerful tool for mounting marketing campaigns that use the planet as a platform. Without leaving their offices, users can place drops around the globe to launch a product, take advantage of distant places or events for promotional or educational purposes, or surround a major event with drops as part of a sponsorship agreement. Publishers of content of all kinds can make sure that content is placed at locations where the content is especially relevant, and this content can be linked to websites, landing pages, e-commerce sites and other digital resources that promote the interests or sell the products or services of the user.

The GPI can also provide a powerful location-selection feature that permits marketers to place drops in places where the local audience will be most receptive to a commercial message, for example. Data on consumer behavior generated by user review and similar services can be analyzed to display "clouds" of territory where people are especially interested in different commercial possibilities, such as "cocktails" or "auto repair." The GPI can display these clouds, letting marketers know where their drops will reach these optimal populations of prospects. Clusters of people who should prove especially interested in a marketer's message can be identified simply by entering a series of terms that correspond to a marketer's target customer profile.

The GPI can give brands and other organizations a new way to market their products or services from a single desktop. It can also permit publishers of any kind to distribute their content across the planet without leaving the office. Users can create and tailor drops to be highly relevant to the location or event to which the drops are attached, making them much more compelling than typical mass marketing messages. The GPI can make it simple to create multiple similar or identical drops and place them in different locations around the globe, and drops can be arranged in batch mode for easy editing.

Thus, Dropcast can allow users to:
  Post one or more multimedia packages combining text, images, video and audio to a digital map from a desktop.
  Add videos to such packages by uploading from the Web, a link, a desktop or a server.
  Add images to such packages by uploading from the Web, a link, a desktop or a server.
  Add music to such packages by integrating with a music streaming service.
  Allow other audio files to be uploaded from the Web, a link, a desktop or a server.
  Use a desktop to identify one or more locations to which to attach packages of multimedia content.
  Time-fence one or more packages of multimedia content attached to a map from a desktop.
  Create and post packages of multimedia content on a digital map in batch mode.
  Edit or delete packages of multimedia content on a digital map in batch mode.
  Post packages of multimedia content in places where the local audience will be most receptive to a commercial message, as determined by consumer "clouds" organized around a particular interest or attribute or series of interests or attributes.
  Publish content that incorporates augmented reality features to a digital map from a desktop.

In particular, the geo-publishing interface can comprise a web interface available only to publishers, marketers and other entities with a business relationship with Dropcast. GPI can allow creating of a drop and publish to multiple locations after allowing search for locations/venues using name, city name, tags, etc.

Workflows can be provided in the GPI tools that can allow more than one drop to be created at once. The remote servers can accept multiple drop objects as input to the drop creation request and can generate a drop for each new location included in the request.

Regarding a relevancy algorithm, when a small number of drops created by the user, drops created by people the user follows, and GPI drops appear on a map, the app can display drops chosen by a relevancy algorithm. When the number of drops created by the user, drops created by people the user follows, and GPI drops is so large as to clutter the map, the relevancy algorithm can also determine which of these drops should display. In addition, the algorithm can be used to serve advertisements to drops. Each drop can include an ad at the bottom when a suitable ad is available.

The algorithm can analyze a number of factors as explained below, but one in particular is especially unique: the behavior of Dropcast users. No other relevance engine takes account of actions related to the creation and consumption of digital multimedia packages on a map, nor does any ad serving system take advantage of behavioral data collected in this fashion. The algorithm can also make it possible to deliver ads to drops that are most likely to be relevant to users in any given location.

The user can change the weighting of the algorithm by adjusting a tool accessed via the app's Settings menu. The requirements for this tool are described below.

Figure 4:
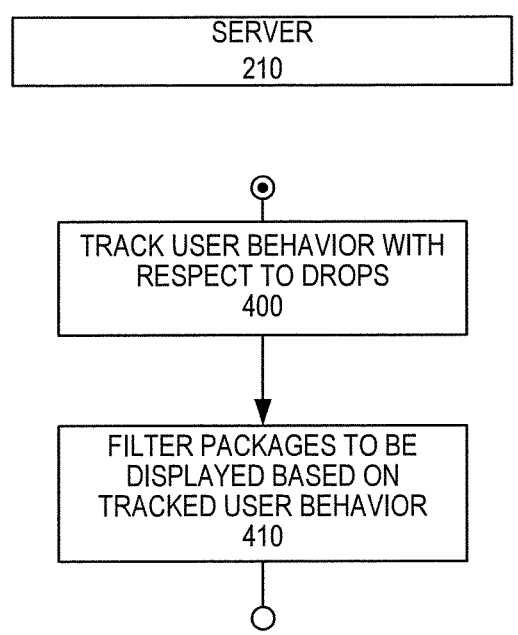
FIG. 4 illustrates an example of a relevancy process based on drops in location-based digital media platform.

As shown in FIG. 4, the relevancy algorithm can help Dropcast users find drops that are most interesting and relevant to them by tracking user behavior with respect to drops (block 400) and filter out those which are of no interest based on that behavior (block 410). For the first time, users benefit from recommendations based on their behavior in creating, opening and acting upon packages of multimedia content that appear on a digital map. The algorithm can also help advertisers and publishers target consumers with content that is most relevant to these consumers and the places they visit.

This feature can filter out unwanted content and optimizes the discovery path for users, ensuring a superior experience and a sense of machine intelligence at work. The results can be instant gratification for users, inspiration and insight for publishers and a better return on investment for advertisers.

The relevancy algorithm can promote some drops and demote others according to a ranking system controllable by the user. The algorithm can analyze at least four factors:
  the popularity of drops in a particular area, as revealed by number of times opened, number of comments within drops, and other criteria.
  the timing of these drops—more recent drops can be favored.
  the user's personal interests as revealed by:
    the user's registration information, taken from external platforms such as Facebook or Twitter accounts used for registration or provided by the user during the registration process and in subsequent queries sent when the user logs in.
    the user's behavior on the network. This behavior can include drops created, drops opened, actions taken within drops (such as sharing drops, clicking on links or unlocking other drops), locations where drops are created, the content of drops, comments made, purchases made via drops, and other data.
  Data about the most interesting locations in a particular area, as revealed by crowd-sourced recommendations, tourist information, and other criteria.

In the Dropcast Settings menu, the user can adjust the weighting of at least these four factors:

If the user wishes to see more locally popular drops (in a city visited for the first time, say), the user can shift the weighting to favor popularity.

If the user prefers to see drops that reflect his or her interests, he or she can shift the weighting in this direction.

If the user wishes to see older drops, he or she can dial down the timing attribute.

If the user wishes to see drops at locations with intrinsic local interest, he or she can add weighting to this attribute.

The user can adjust the weighting at any time.

Thus, Dropcast can provide a relevancy algorithm that:

Incorporates data considering users' creation and consumption of packages of multimedia content affixed to a digital map.

Incorporates data on user behavior with these multimedia packages, such as number of packages created, number of packages opened, actions taken within these packages (such as sharing them, clicking on links or unlocking other packages that were previously invisible to the user), locations where packages are created and opened, the content of these packages, comments made within these packages, purchases made via these packages, and other user interaction data.

Combines this data with the popularity of multimedia content packages on the map, the timing of these packages, the intrinsic usefulness of these packages, and user interest in these packages in the manner described above.

Allows users to adjust the weighting of at least all four factors included in the relevancy algorithm in the manner described above, and allows these adjustments to be made at any time via a Settings menu in the platform.

Drives advertisements to packages of content on the map where users are most likely to be interested in and respond to these ads.

Is used to filter packages of multimedia content attached to a digital map.

In particular, the relevancy algorithm can be used on the backend to surface relevant content to the mobile app user. The algorithm can assign weighting structures to the tag match and return the most relevant drops to the user at his or her current location.

This algorithm can use at least 4 inputs:

User tags: The user tags can be collected using the self-identified interests as well as tracking behavior on the mobile app. Examples of behavior can include types of drops viewed, types of drops created, types of drops favorited, types of locations visited.

Tags placed on locations: These can be collected based on external data sources as well as place tagging being accumulated on the Dropcast backend servers.

Tags placed on drops: These tags can be derived from the user creating the drops, the GPI user creating a drop, or the tags from locations where it is dropped.

Tags placed on the content, such as photos, videos and music files—that is, published in drops.

Figure 5:
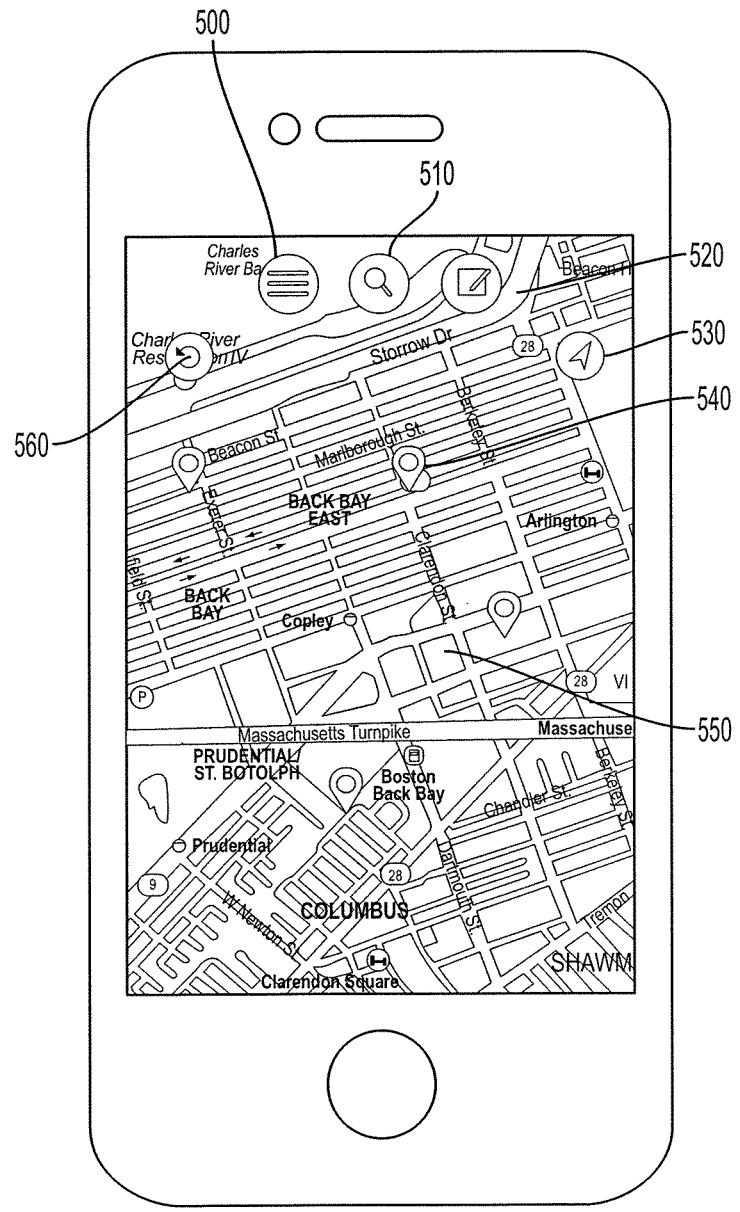
FIGS. 5-76 illustrate examples of a user interface of a location-based digital media platform.
Figure 76:
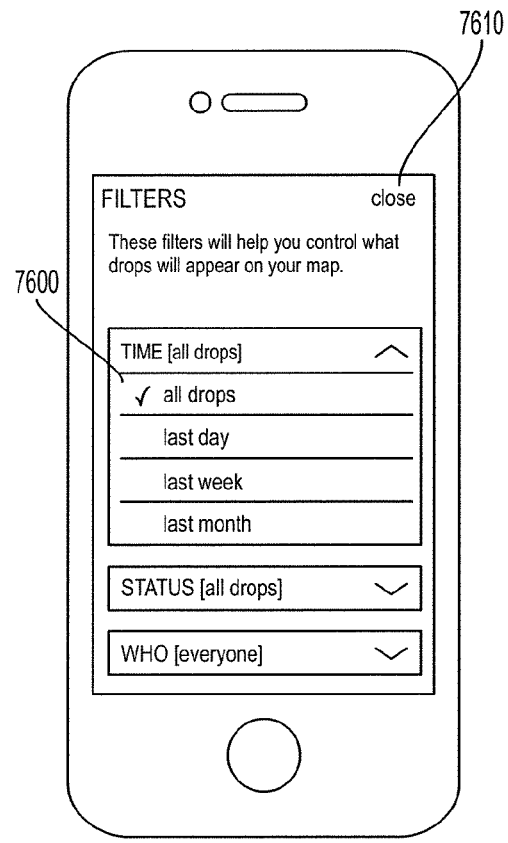

FIGS. 5-76 illustrate examples of a user interface of mobile client 230 of platform 200. With respect to a screen flow for mobile client 230, screens (e.g., web pages) relating to different functionality can slide in from different sides of the screen. For example, screens related to "search" can slide in from the top (sliding top to bottom), screens related to "menu" and any system screens can slide in from the left (sliding left to right), and screens related to "media player" can slide in from the bottom (sliding bottom to top). Also, screens related to "Create a Drop" can slide in from the right (sliding right to left) and screens related to "View a Drop," including list view and profile, can slide in from the bottom (sliding bottom to top).

FIG. 5 shows an example of a home screen. In this example, invoking menu icon 500 (for example, by the user tapping the icon on the screen) can open the menu, which can slide in from the left. Tapping search button 510 can put the app into search mode (see FIGS. 22-26, for example). Invoking "Create" button 520 can bring in the options for drop creation, which can slide in from the right (see FIG. 35, for example). Invoking recenter button 530 can return the user to their current location on the map. Recenter button 530 can appear when the map is centered elsewhere. Drops can appear as icons 540 on the map. Touching them can bring up the drop preview. Map 550 can always be present within the app. It can offer typical map functionality (pinch & zoom, move, etc.). When other modalities are active, the map can withdraw to the background. Invoking refresh button 560 can check for new drops and display them.

Figure 8:
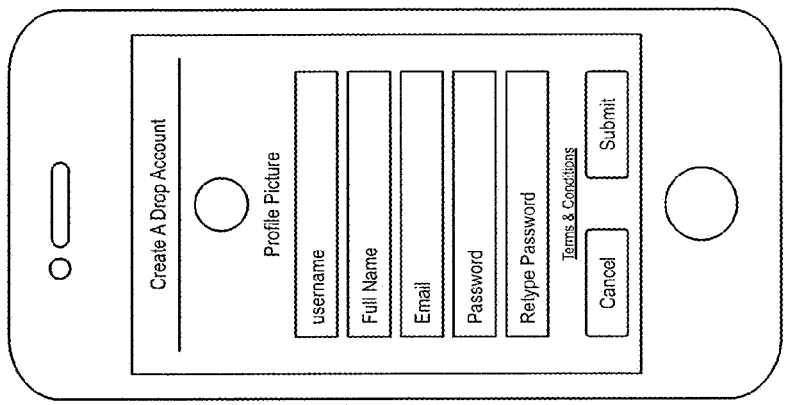
Figure 7:
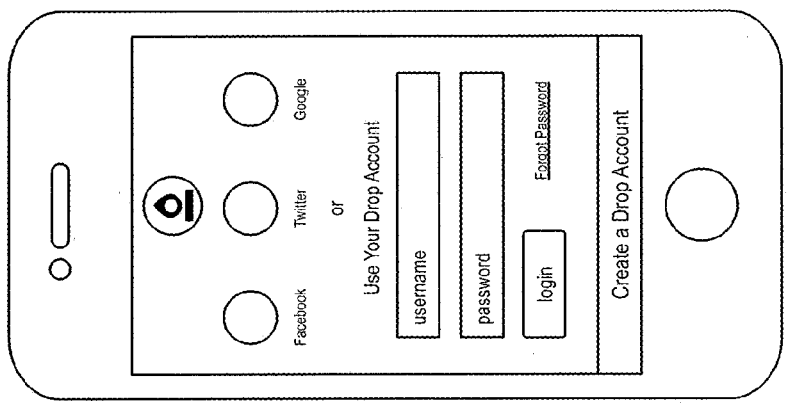
Figure 6:
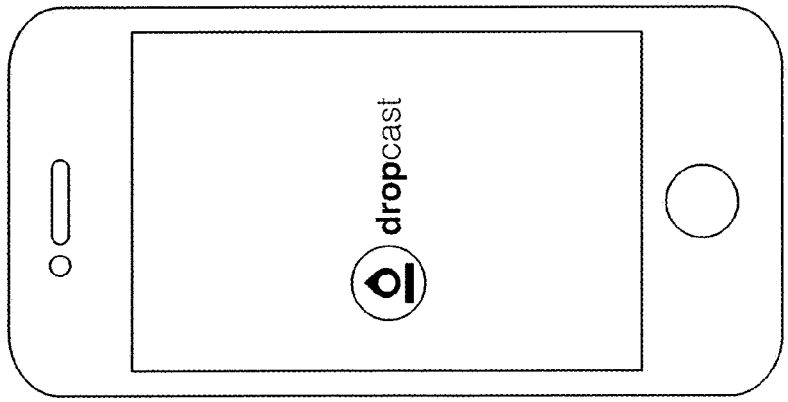

FIGS. 6-8 show examples of login and register screens. The screen in FIG. 6 shows the name of the app. The screen in FIG. 7 allows a user to create or log in under an internal ("Dropcast") account or log in via a linked external platform such as a social networking site. The screen in FIG. 8 shows the information required to create a Dropcast account, such as username, full name, email and password.

Figure 11:
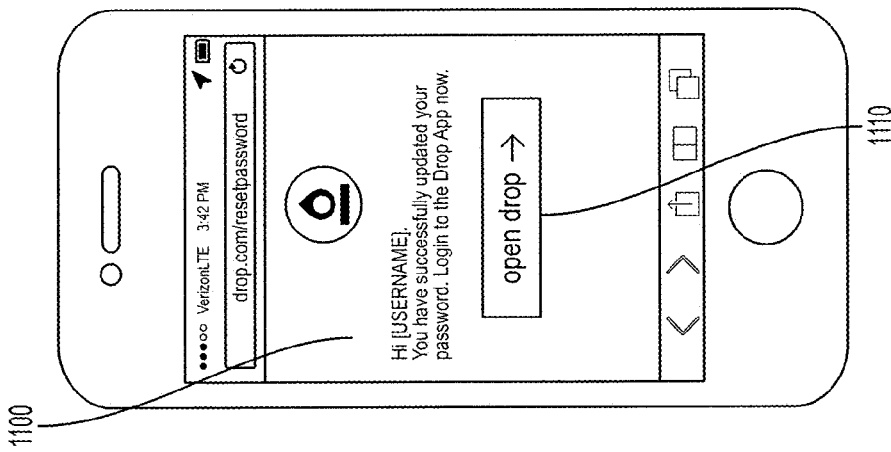
Figure 10:
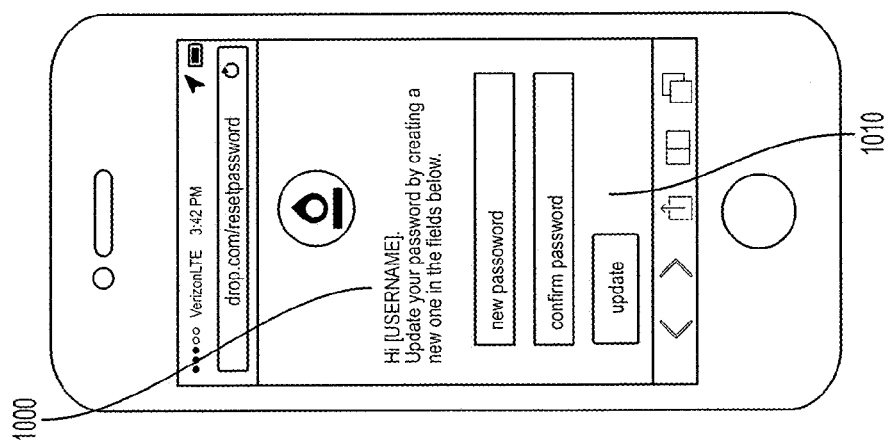
Figure 9:
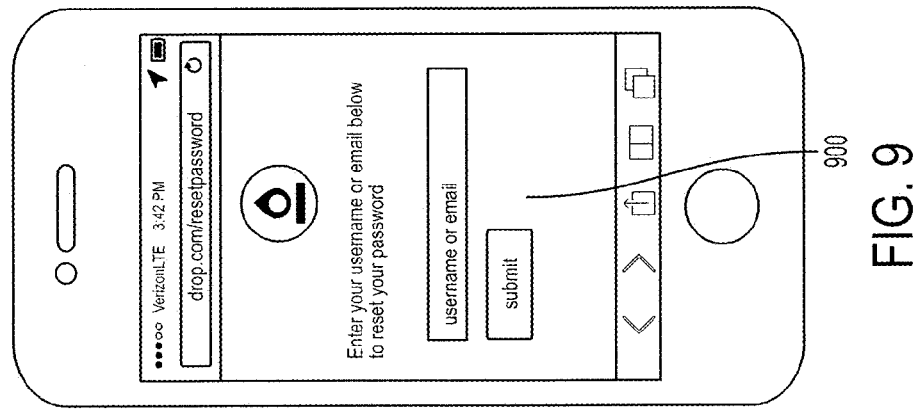

FIGS. 9-11 show examples of reset password screens. When the user invokes the "Forgot Password" link within the app (as shown in FIG. 7, for example), screen 900 as shown in FIG. 9 can be opened where the user can enter either identifying information such as his or her username or email. After successfully submitting the username/email by invoking the "submit" button, the user can receive an email with a link to reset his or her password. Invoking this link can open page 1010 shown in FIG. 10. Username 1000 can display on page 1010 to provide confirmation that the user is resetting the password to the correct account, as well as reminding the user of the correct username. Upon successfully updating his or her password, the user can be taken to confirmation screen 1100 as shown in FIG. 11. If viewed on a mobile device, "open drop" button 1110 can appear that can open the Dropcast app and allow the user to login with his or her new password.

Figure 14:
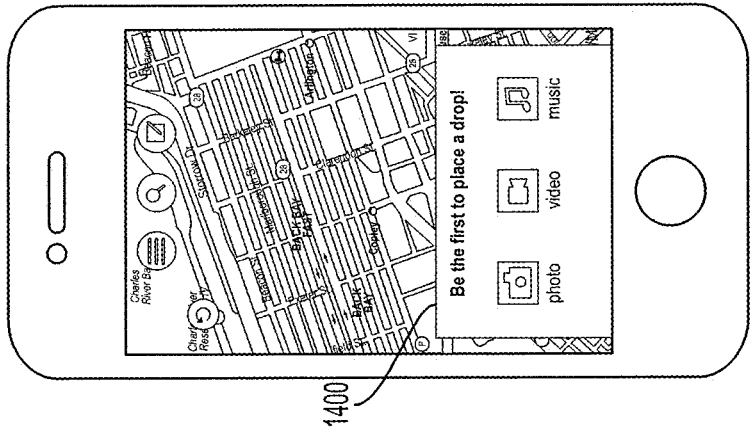
Figure 13:
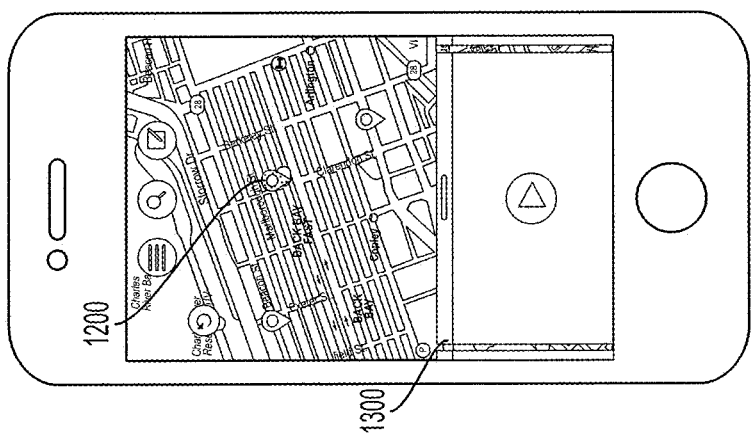
Figure 12:
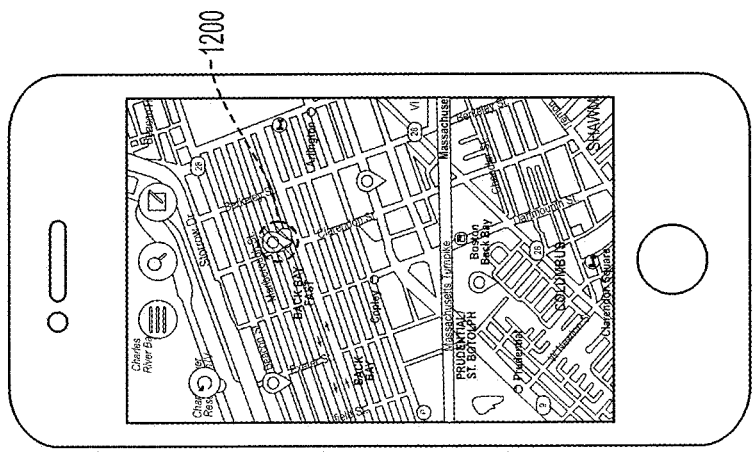

FIGS. 12-14 show examples of initial screens. Tapping drop icon 1200 in FIG. 12 (as shown by the shaded overlay on icon 1200 representing the impression of a user's finger) brings up drop preview 1300 from the bottom. The map can recenter so that the selected icon will be in the middle of the screen (see FIGS. 15 and 26, for example). Also, drop icon 1200 can change visually to indicate a selected state as shown in FIG. 13. If there are no drops within view of the map, prompt 1400 can appear as shown in FIG. 14 to suggest the user should create a drop comprising one or more media types, such as photo, video, music and/or text.

Figure 15:
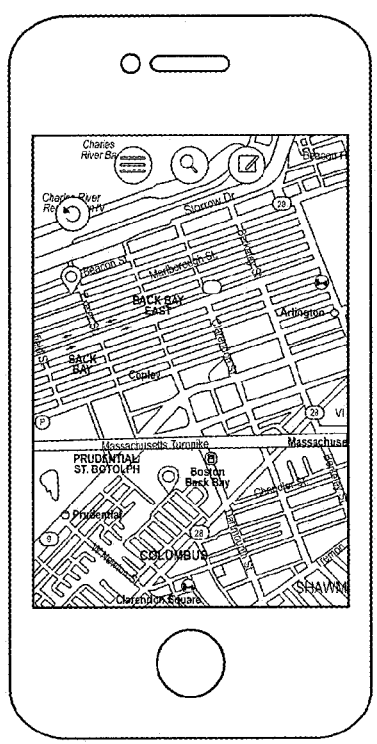
Figure 16:
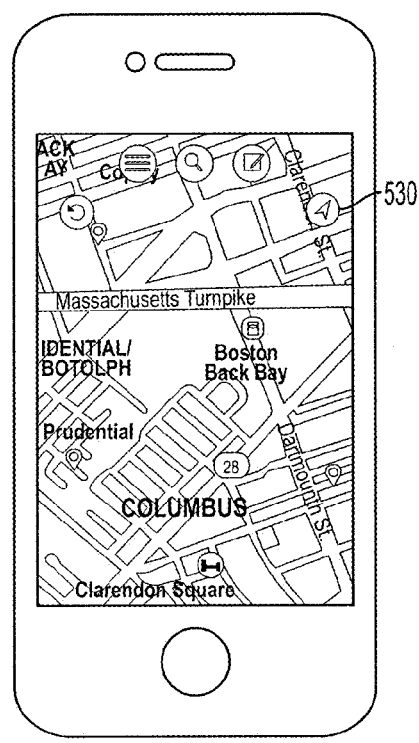

FIGS. 15 and 16 show examples of a recentering feature of mobile client 230. For example, as shown in FIG. 15 the app can decline to display recenter button 530 when the map is centered to where the user is located. Once the map is moved, as shown in FIG. 16, recenter button 530 can appear, and invoking recenter button 530 can recenter the map on the user's location.

Figure 17:
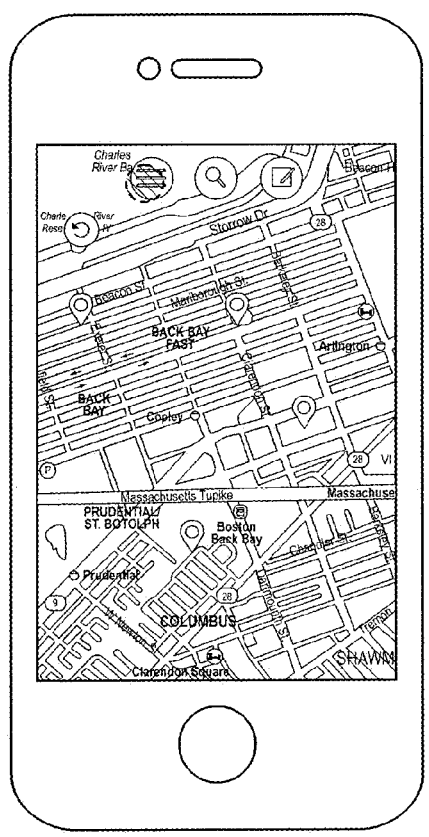
Figure 18:
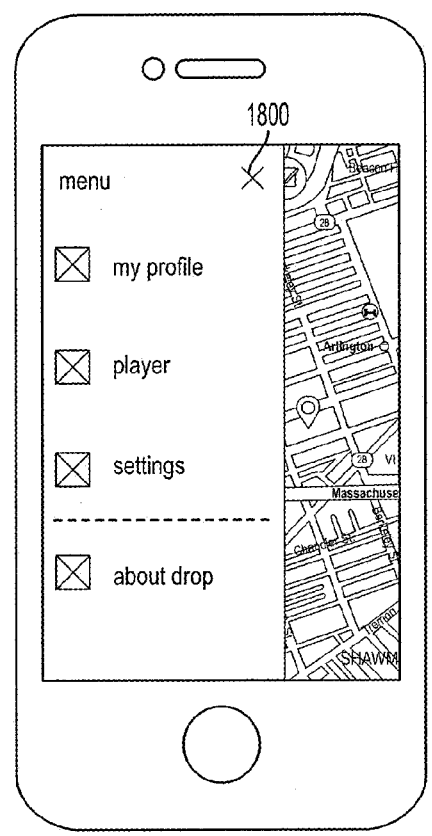

FIG. 18 shows an example of the display of menu 1800 in response to tapping menu icon 500 as indicated by the shaded overlay in FIG. 17. Menu 1800 can slide in from the left to present menu options that allow the user to access his/her profile ("my profile"), media player ("player"), setting ("settings") and general platform information ("about drop"). Other suitable information can also be accessible from menu 1800, such as favorites including people, location and/or drops and drop history.

Figure 21:
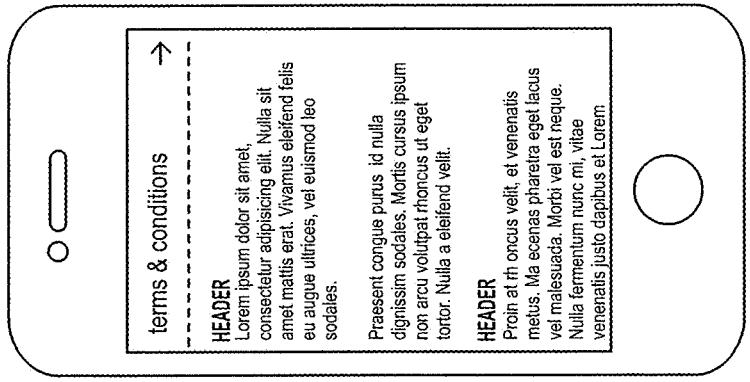
Figure 20:
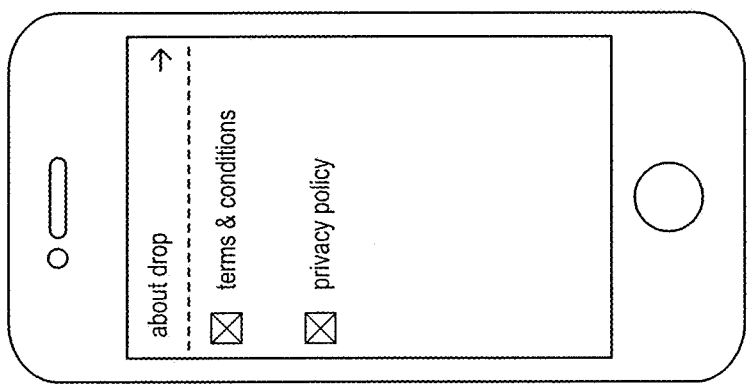
Figure 19:
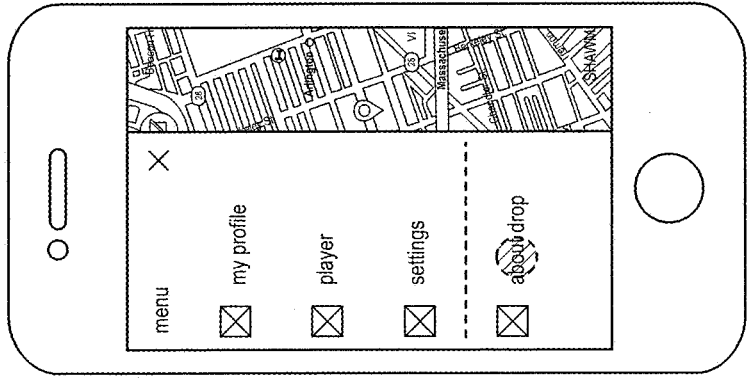

FIGS. 19-21 show examples of informational screens about the platform. For example, tapping the "about drop" menu option as indicated by the shaded overlay in FIG. 19 can bring up the page shown in FIG. 20, which displays informational options such as terms and conditions and privacy policy. Invoking the term and conditions option can bring up the page shown in FIG. 21, which can provide detailed information on the terms and conditions associated with use of the platform.

FIGS. 22-26 show an example of a predictive search feature of mobile client 230. Mobile client 230 can provide any suitable number of types of search, such as by people and/or drops, for example. When an artist or friend (e.g., "people") is selected, the app can take the user to the profile page for that selection. When a drop is selected by a user, the map can recenter on the selected drop and invoke the preview panel can display the selected drop. The app can also display the drops in that area for which the user has access, which can take into account the drops that the app can only display to a user once the user has physically visited that location.

Figure 24:
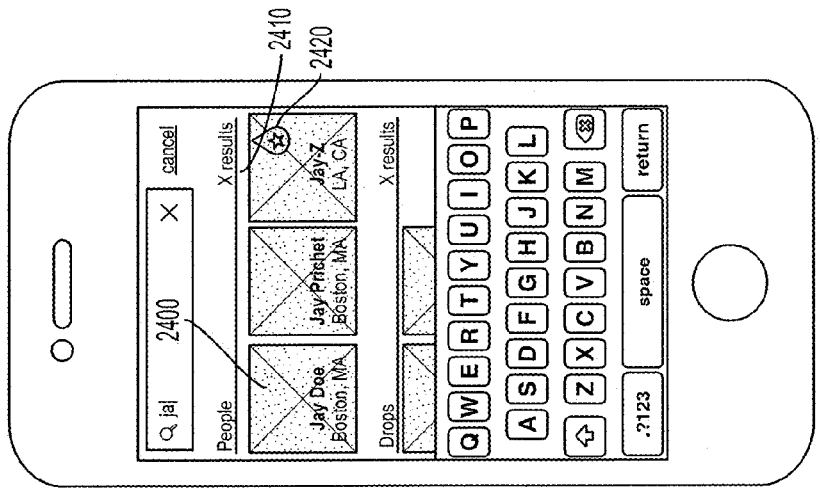
Figure 23:
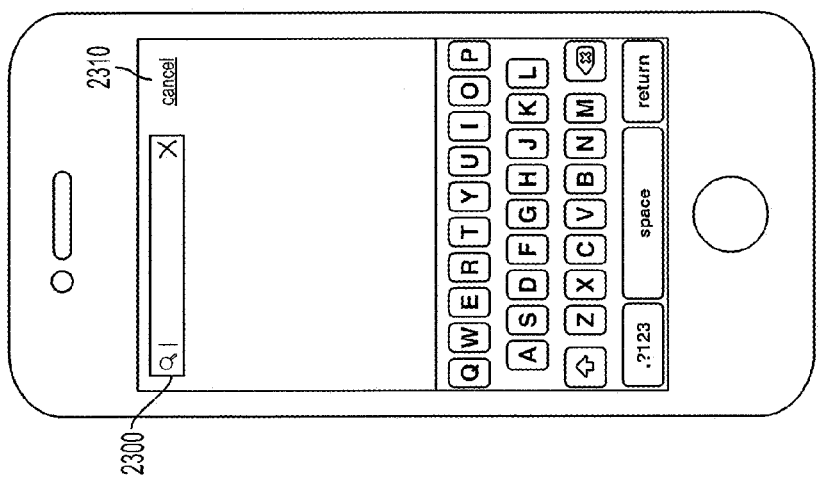
Figure 22:
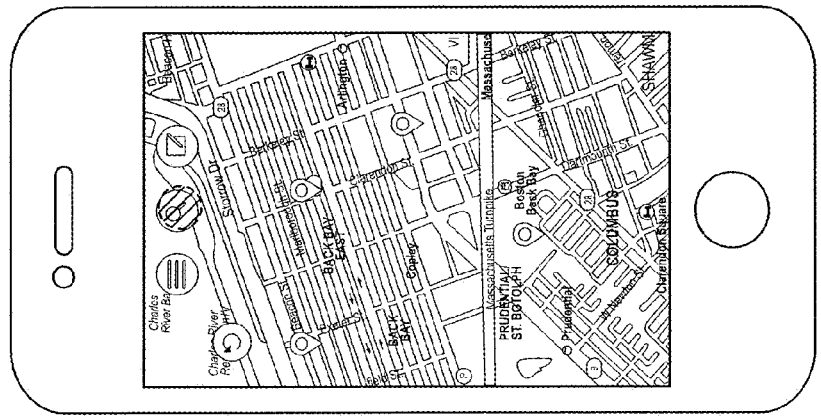
Figure 25:
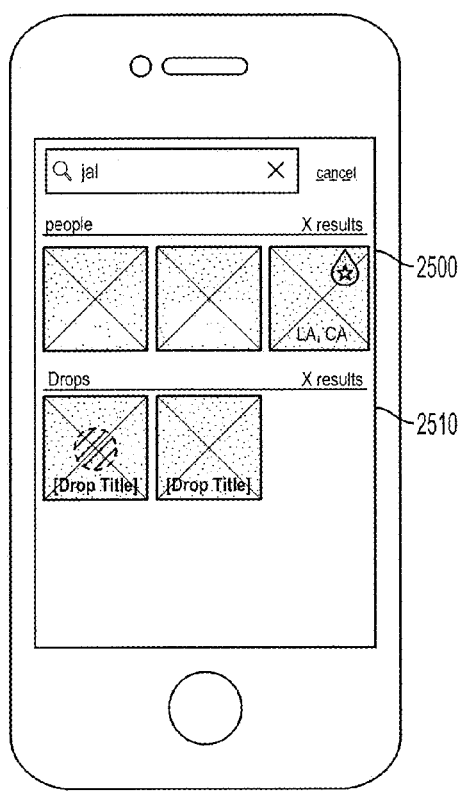
Figure 26:
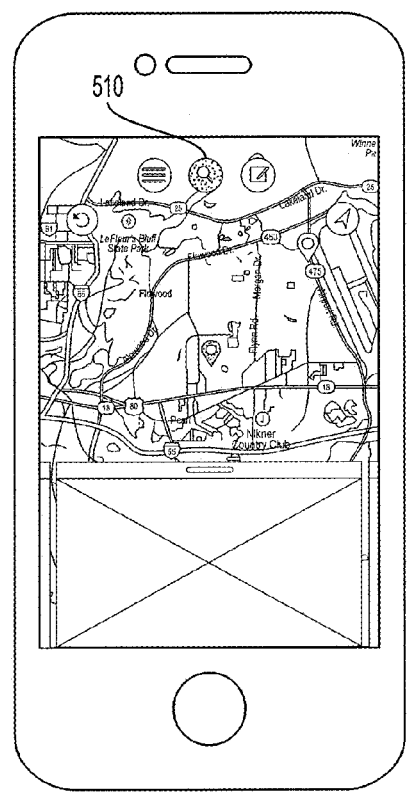

Invoking search button 510 as indicated by the shaded overlay in FIG. 22 can put the app into search mode, opening search bar 2300 and the keyboard shown at the bottom of the screen in FIG. 23. Invoking "Cancel" button 2310 can close the search mode. As shown in FIG. 24, the app can display results 2400 as the user types the search query, and can grouped them in any suitable manner such as by People and Drops. The app can display count 2410 of the results in a particular search group, and verified accounts—such as artists for example—can display badge 2420. As shown in FIG. 25, results within a group such as people results 2500 and drops results 2510 can be scrollable in any suitable manner, such as horizontally, and upon a user invoking a result, as indicated by the shaded overlay on the first drop result, the app can display the results for that selection as shown in FIG. 26. As also shown in FIG. 26, search button 510 can be highlighted to indicate there is a value in the search field. Invoking search button 510 can return the user to search with the previous value in the search field.

Figure 28:
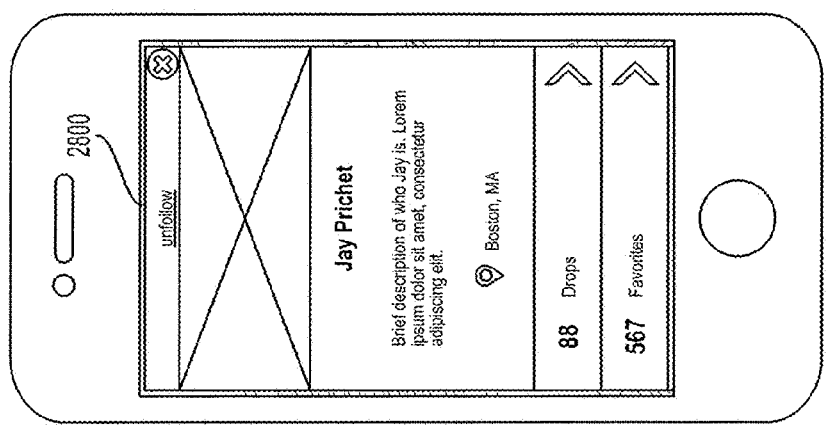
Figure 27:
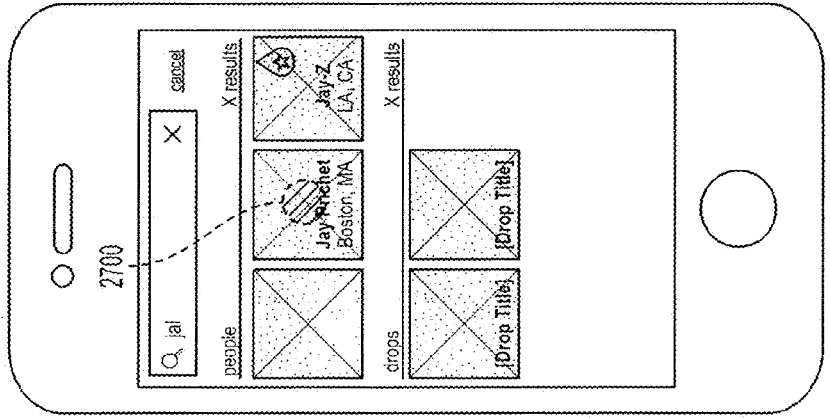

FIGS. 27-33 show an example of a user profile provided by mobile client 230. As shown in FIG. 27, upon a user selecting (as indicated by the shaded overlay) result 2700 ("Jay Prichet"), such as a friend or artist, from the search results, the app can bring the user to that person's profile as shown in FIG. 28. The app can also provide link 2800 on the profile page that toggles between "follow" and "unfollow" to allow the user to toggle between following that user (by clicking the "follow" link for that user—not shown) and unfollowing that user (by clicking the "unfollow" link for that user).

Figure 29:
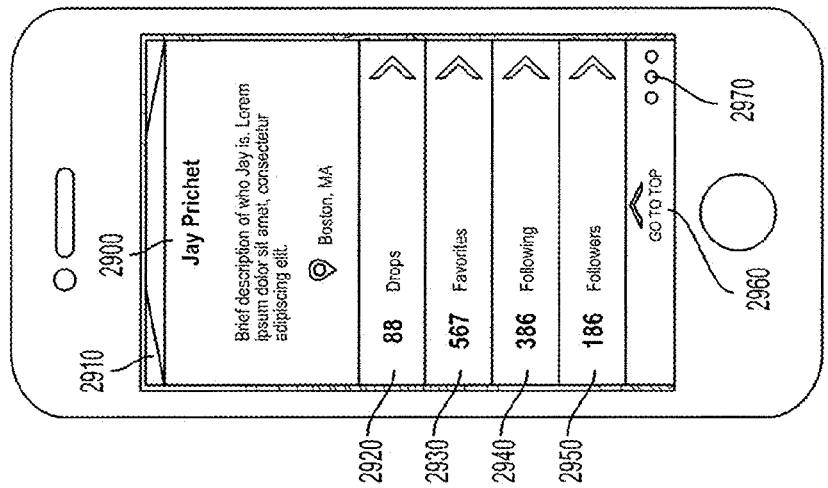

As shown in FIG. 29, user profile 2910 can provide name 2900 of that user ("Jay Prichet") and a brief description of that user provided by that user. Invoking option 2920 ("Drops") can take a user to a list of drops placed by that user. Invoking option 2930 ("Favorites") can take a user to a list of drops favorited by that user. Option 2940 ("Following") can take a user to a list of people (users) that the user follows. Option 2950 ("Followers") can take a user to a list of people (users) following that user. "Go To Top" option 2960 can take a user back to the top of user profile 2910, and report icon 2970 can allow a user to report a profile for inappropriate content.

Figure 32:
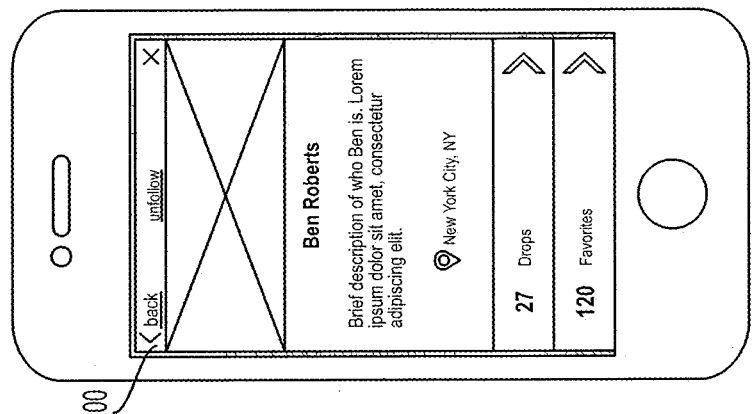
Figure 31:
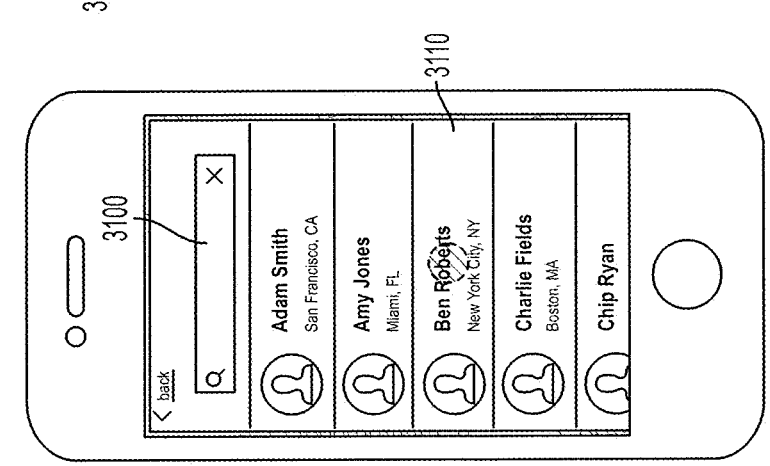
Figure 30:
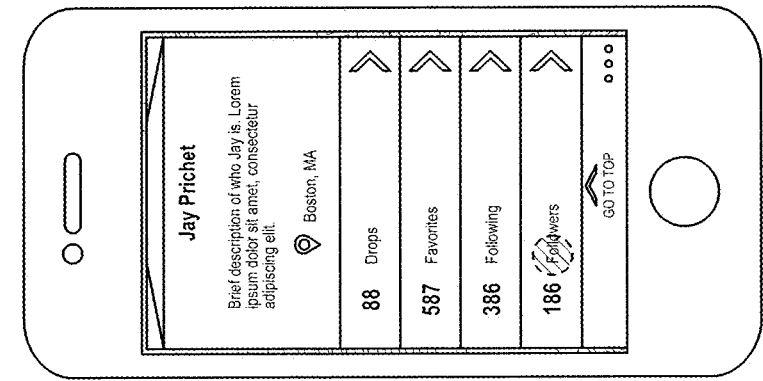

For example, invoking the "Followers" option as indicated by the shaded overlay in FIG. 30 can take a user to a followers page as shown in FIG. 31 which displays a list of people (users) following that user. In the followers page, the "back" link can take a user back to the profile and search bar 3100 can allow a user to quickly narrow the followers results in the same manner described above with respect to predictive searching (i.e., as the user types, the list filters in real time). Results 3110 can include any suitable description such as the user's profile picture, name and designated home town. Invoking a result as indicated by the shaded overlay in FIG. 31 can take a user to that user's profile as indicated in FIG. 32. The back button in that user's profile as shown in FIG. 32 can allow a user to return to the followers list shown in FIG. 31.

Figure 33:
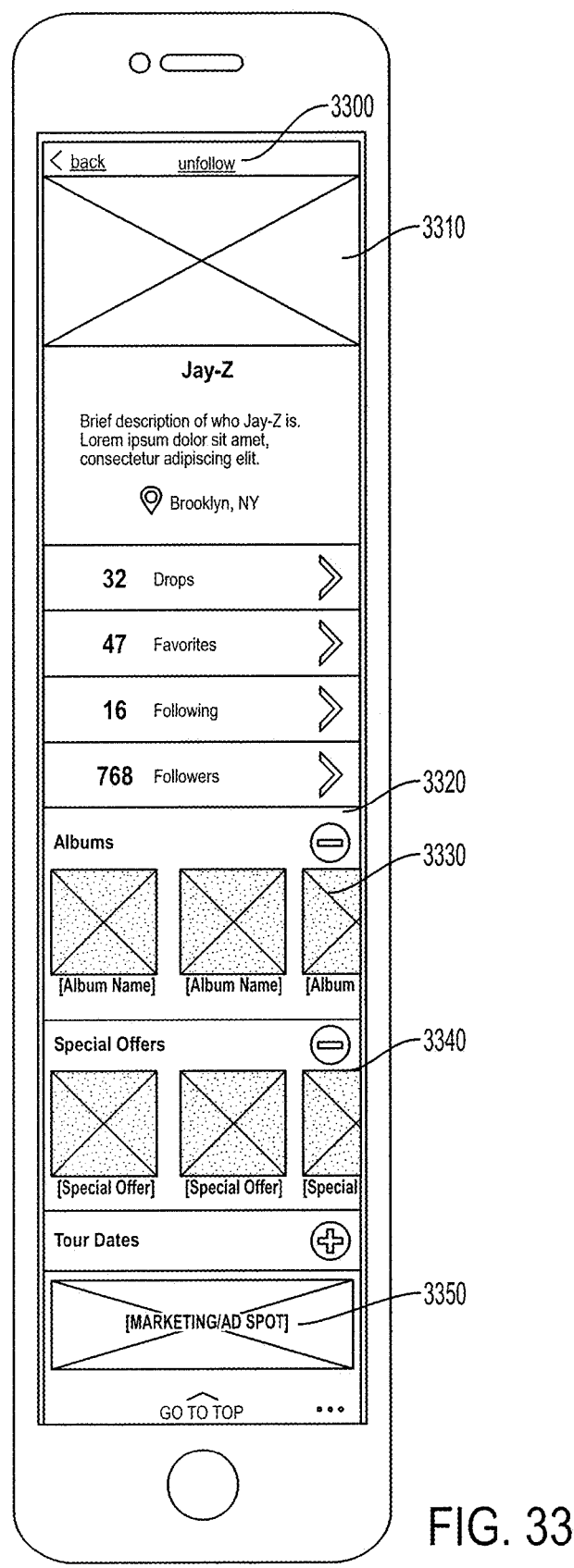

FIG. 33 shows an example of an artist's profile page that can include any suitable artist information. For example, similar to link 2800, link 3300 allows a user to follow an artist like any other user profile. Header 3310 forms the header of the artist page and can feature a large image/profile picture along with the artist's name. Several elements of the artist's profile page can expand/collapse, as indicated by expand/collapse icon 3320. Panel 3330 can make available the artist's albums which can also be scrollable horizontally. Panel 3340 can make available merchandise for the artist, and a user can scroll horizontally and select to purchase. Panel 3350 can provide an advertising banner in the artist page where appropriate.

FIGS. 34-53 show examples of creating drops via mobile client 230. The example in FIGS. 34-50 relate to creating and posting a photo drop. The example in FIGS. 51-53 relate to creating a music drop.

Figure 36:
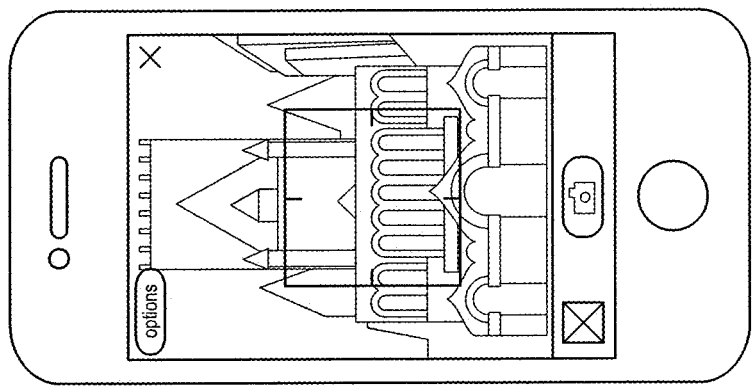
Figure 35:
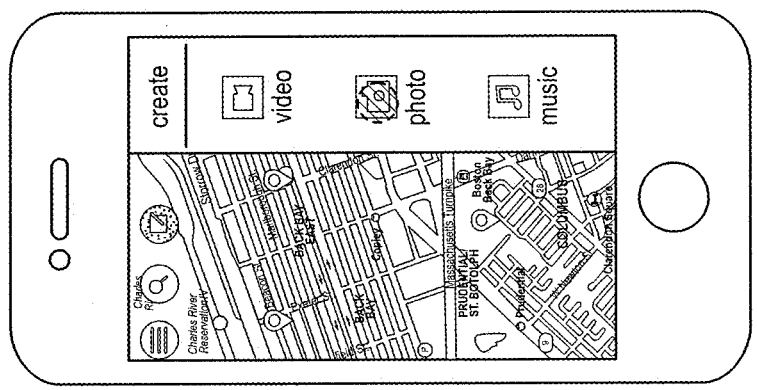
Figure 34:
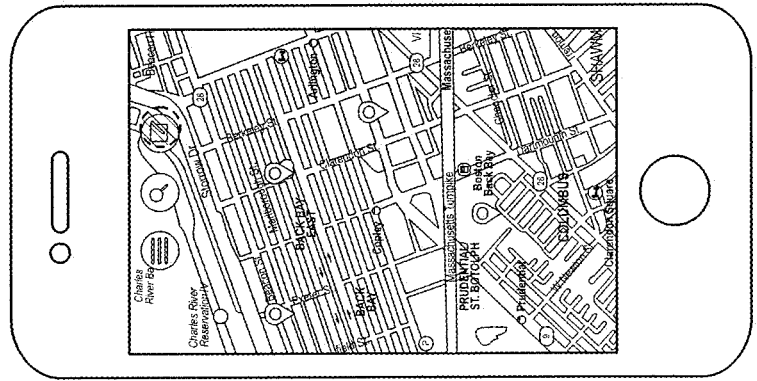

Upon invoking the "create" button as indicated by the shaded overlay in FIG. 34, content options for drop creation (e.g., "video," "photo," "music") can be displayed, such as by sliding in from the right side of the screen as shown in FIG. 35. Upon invoking the "photo" button as indicated by the shaded overlay in FIG. 35, a media selection screen can be displayed as shown in FIG. 36 in which the app can access an exposed API on the mobile device hosting mobile client 230 that allows a user to capture and record a photograph using the mobile device's camera or to select a stored photograph.

Figure 39:
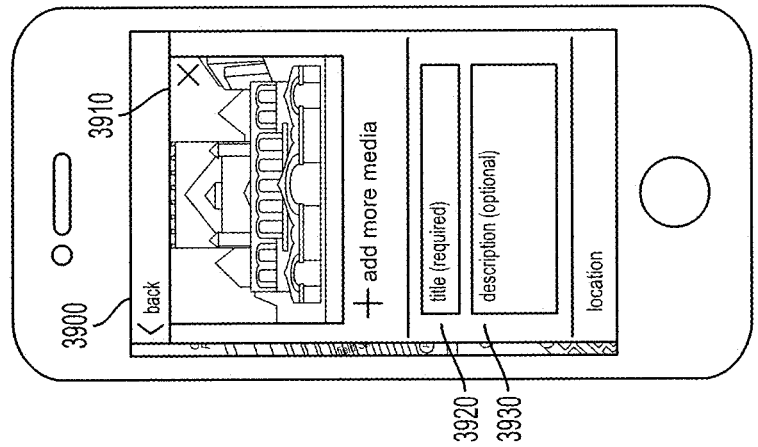
Figure 38:
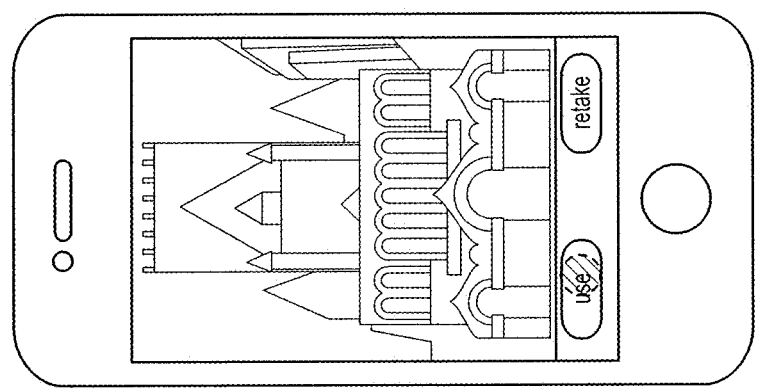
Figure 37:
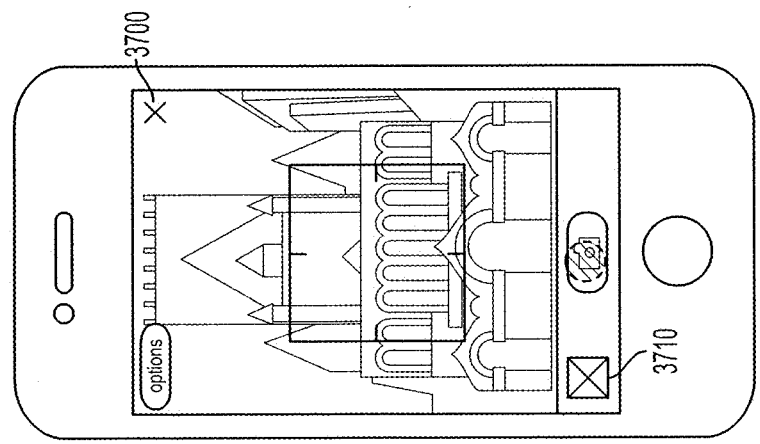

As shown in FIG. 37, invoking "X" icon 3700 can return the user to the main app screen, effectively canceling the "create a drop" process. Invoking folder icon 3710 can take a user to the photo gallery on the phone to allow the user to select a stored photo for the drop. Invoking the camera icon as indicated by the shaded overlay in FIG. 37 can snap a live picture to be used for the drop. As shown in FIG. 38, once a picture is snapped options can be presented for the user to use the picture or retake it. Upon invoking the "use" button as indicated by the shaded overlay in FIG. 38, a drop creation screen can be displayed as shown in FIG. 39 to allow the user to describe the drop and add additional media if desired. Pressing either "back" button 3900 or "X" icon 3910 can remove the selected media and return the user to the previous media selection screen. The app can require a title for the drop to be entered in title field 3920 while a description in description filed 3930 can be optional.

Figure 41:
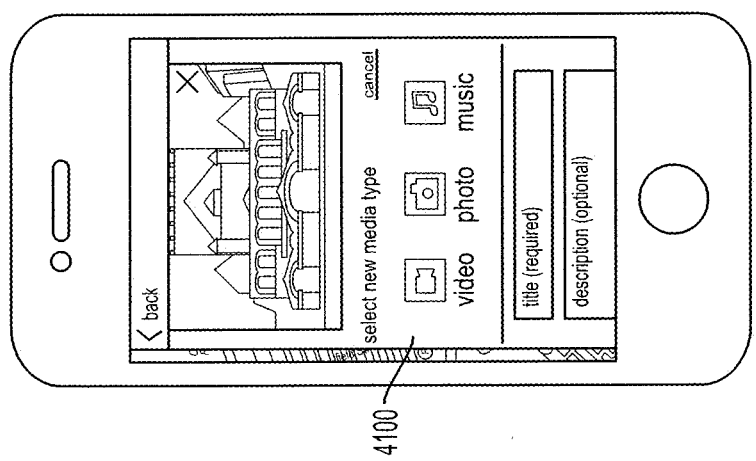
Figure 40:
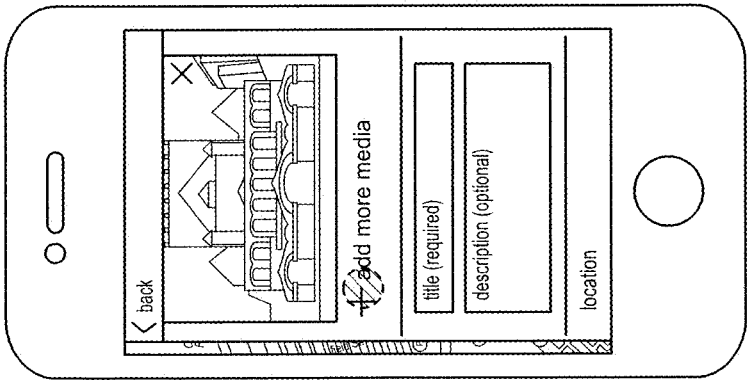

As shown in FIG. 40, a user can add additional media by invoking the "add more media" button as indicated by the shaded overlay. When a user invokes the "add more media" button, options 4100 can be displayed as shown in FIG. 41 by expanding downwards for example. The user can make a selection and can then be taken through the process as previously defined for adding media.

Figure 42:
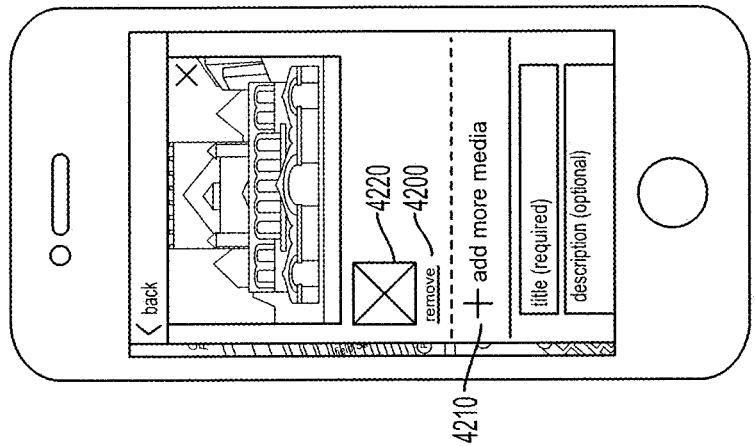

Once additional media is added, it can appear below the primary media in panel 4220 as shown in FIG. 42. The additional media can be displayed horizontally as more media is added and can become horizontally scrollable if needed. The additional media can be removed by invoking "remove" link 4200 below it, and the user can repeat the process of adding additional media by invoking the "add more media" button in panel 4210.

Figure 45:
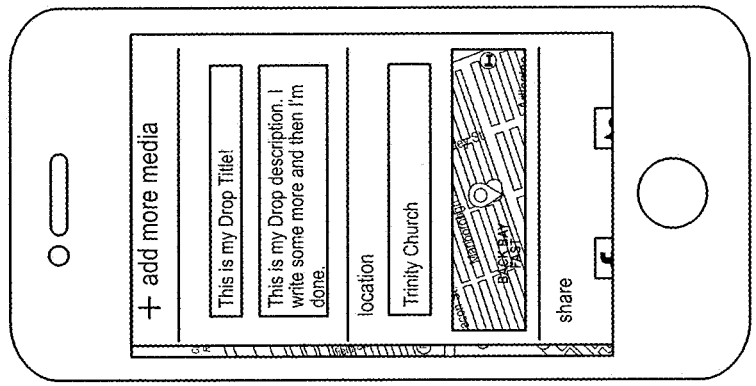
Figure 44:
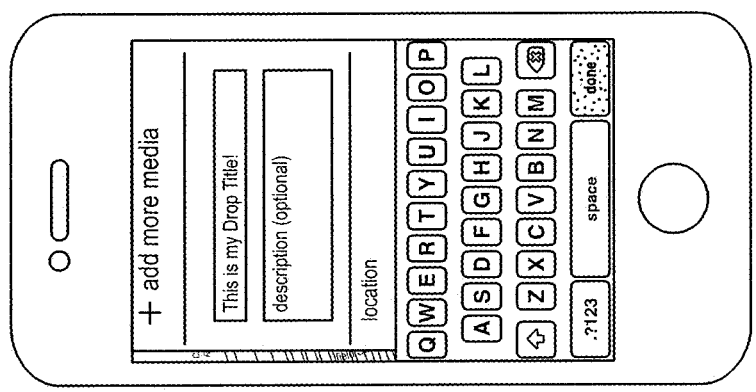
Figure 43:
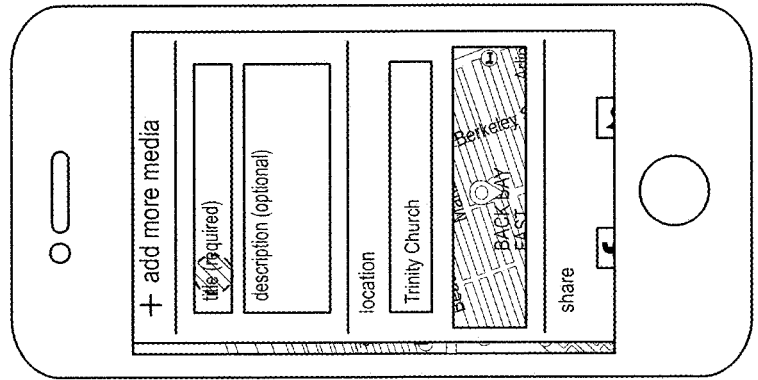

The user can enter a title for the drop by tapping into the title field as indicated by the shaded overlay in FIG. 43, causing the keyboard shown in FIG. 44 to open for accepting type input. The user can also enter a description for the drop by tapping into the description field and typing on the keyboard. (It should be appreciated that the terms for specifying user input action used herein, including for example clicking, tapping, pressing, are used interchangeably and are not intended to specify a particular type of user input device.) When the user is finished entering the title and description, the user can select the "done" button on the keyboard shown in FIG. 44, which removes the keyboard from the screen as shown in FIG. 45.

Figure 48:
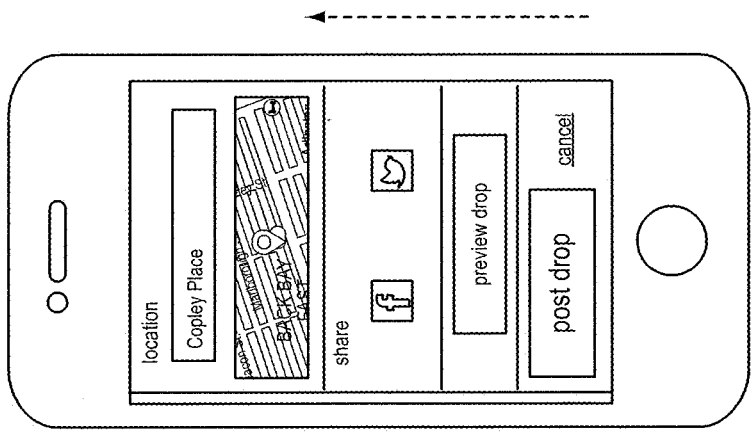
Figure 47:
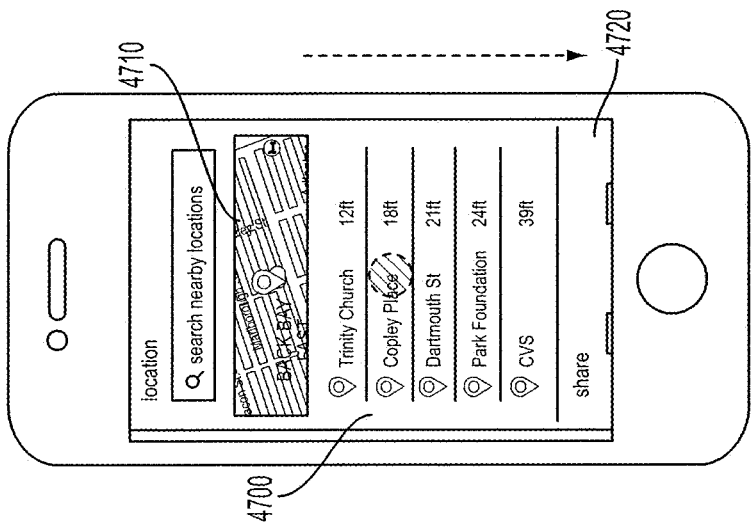
Figure 46:
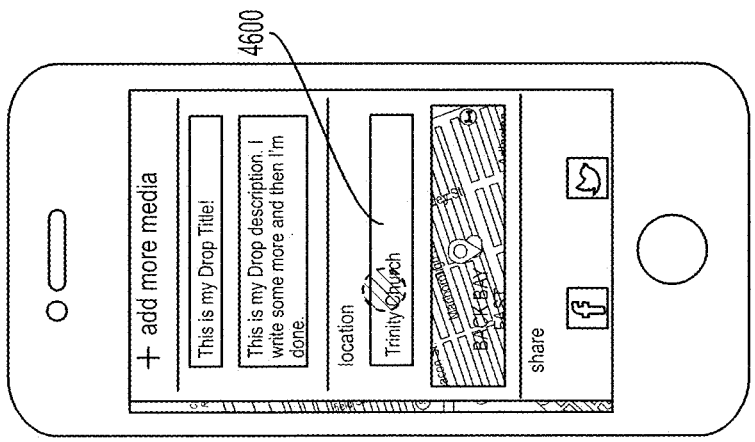

The "location" field can be pre-populated based on location (e.g., "Trinity Church"), but can also allow the user to click into it to change. For example, when a user clicks into location field 4600 as indicated by the shaded overlay in FIG. 46, list 4700 can immediately expand to show nearby locations as shown in FIG. 47. The user can select from one of the shown locations or type in the search field to filter/search the list. Map 4710 can also show where the selected location is. Menu 4720 can expand, e.g., sliding down, to accommodate the location choices. Once a location selection is made, the list can collapse and the rest of the drop form menu can slide up as shown in FIG. 48.

Figure 49:
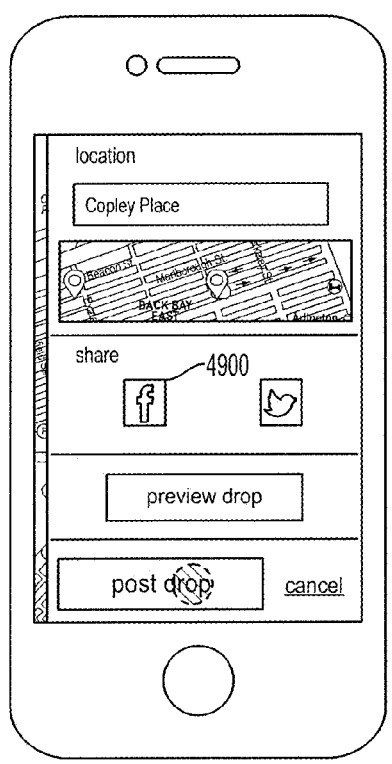
Figure 50:
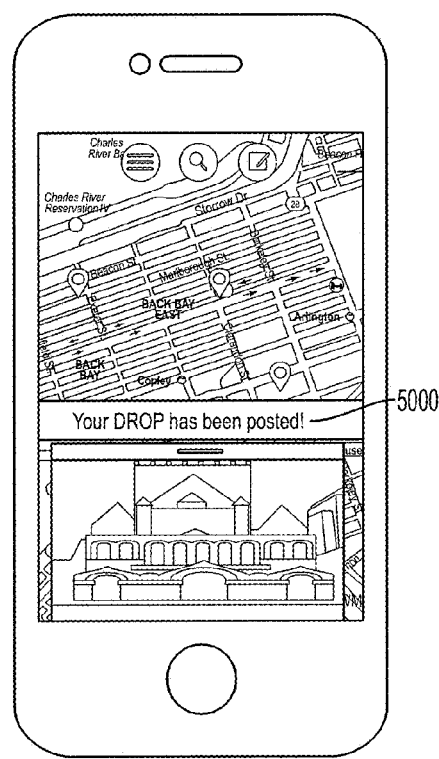

As shown in FIG. 49, by invoking a relevant social media button such as button 4900, the drop can be posted to that corresponding platform upon selection of the "post drop" button as indicated by the shaded overlay in FIG. 49. As shown in FIG. 50, the app can provide confirmation 5000 that the drop was posted successfully and can display it in the same format as displayed to all other users. The user can also preview the drop prior to posting by invoking the "preview drop" button shown in FIG. 49.

Figure 53:
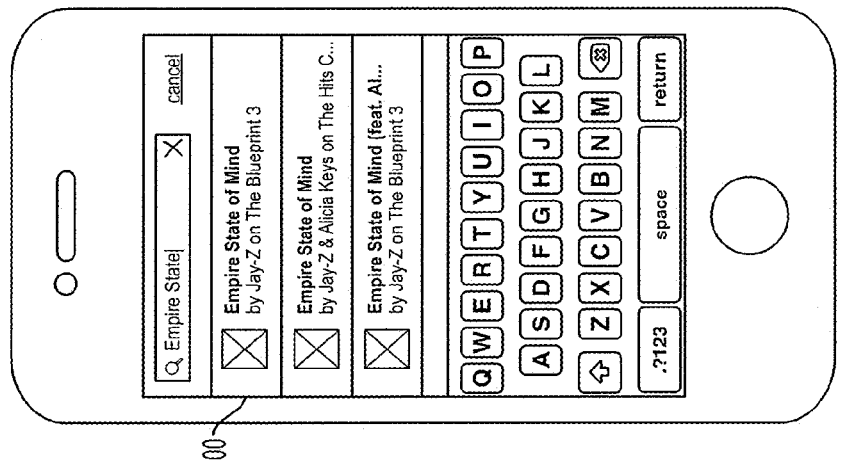
Figure 52:
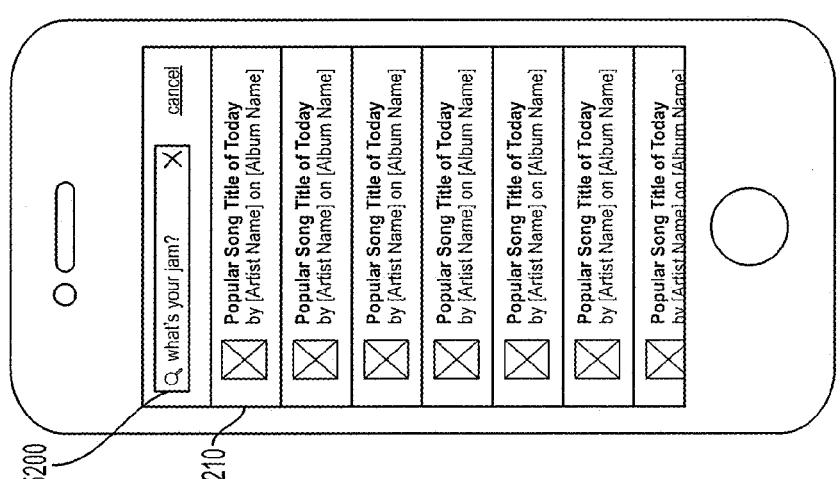
Figure 51:
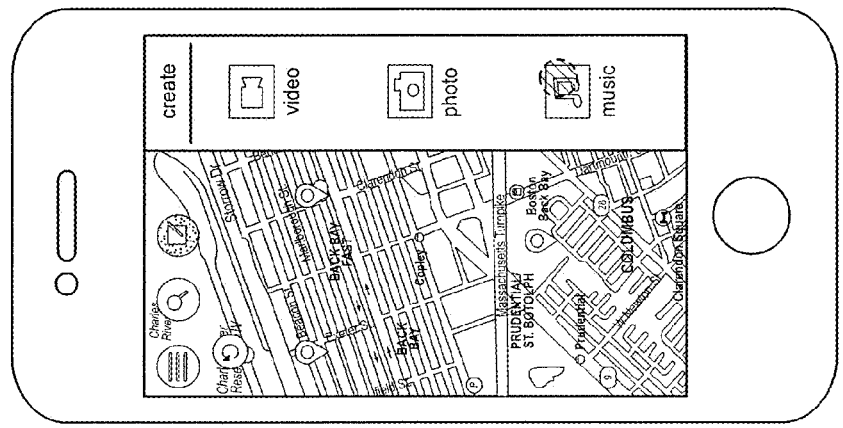

With respect to creating a music drop, invoking the "music" button as indicated by the shaded overlay in FIG. 51 can display a media selection screen as shown in FIG. 52. In this media selection screen the app can provide search field 5200 where the user can enter a music search query. When no search terms are entered, the app can suggest list 5210 of relevant songs based at least in part on the relevancy algorithm as explained above (e.g., most popular, based on the user's profile and interests, etc.). As shown in FIG. 53, result 5300 can include any suitable descriptive information such as a picture of the relevant album/song/artist, the song title, the artist name, and the album from which it came. The user can select a song by invoking that result. Once invoked, the user can be taken to the next step in the "Create Drop" process (see FIG. 39 for example).

Figure 56:
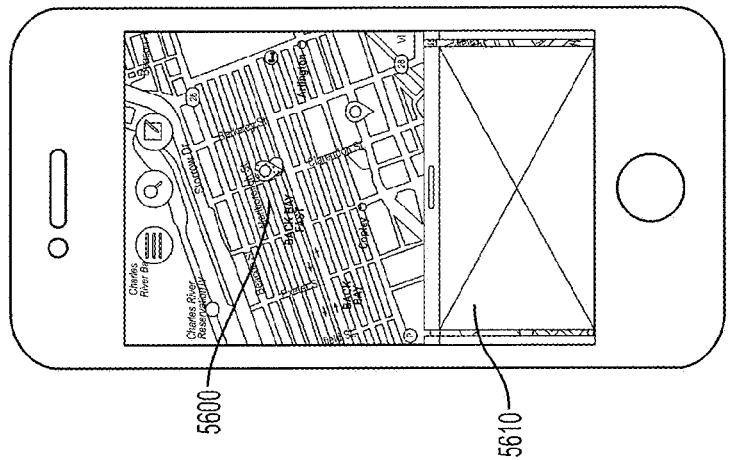
Figure 55:
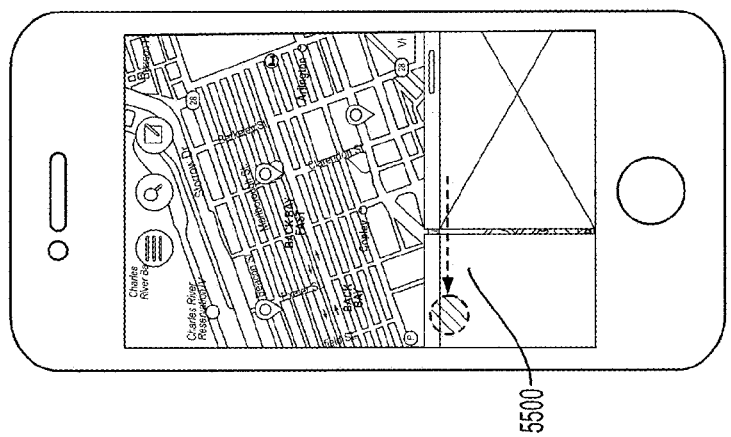
Figure 54:
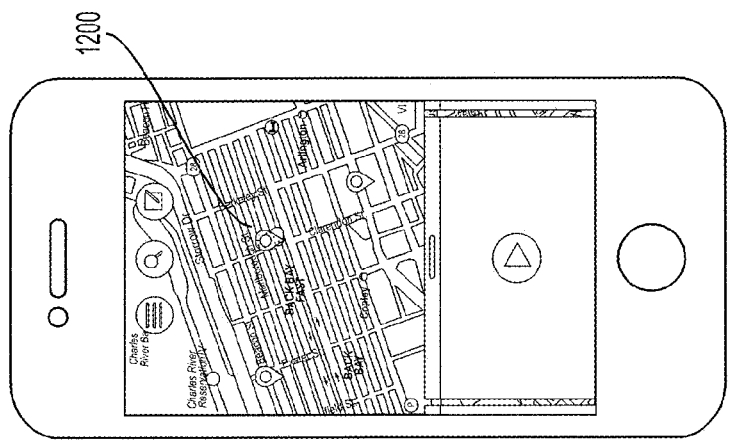

FIGS. 54-71 show examples of viewing drops via mobile client 230. As shown in FIG. 54, the first time a user taps drop icon 1200, a preview for that drop can open from the bottom and the map can re-center on that drop. Tapping the same drop icon a second time can open the drop to full view. To browse drops, as indicated by the shaded overlay in FIG. 55 a user can perform swipe 5500 sideways to view the next drop, which can be determined by proximity. As shown in FIG. 56, once swiped far enough, the next drop 5600 can snap into place on preview panel 5610 causing the map to re-center on new drop.

Figure 59:
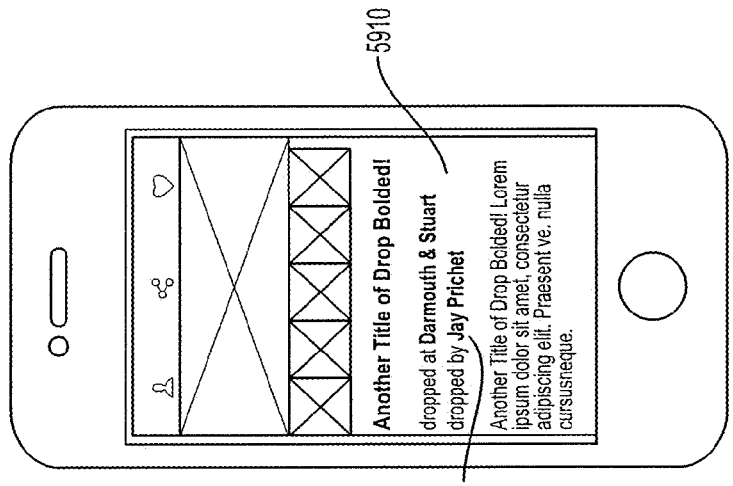
Figure 58:
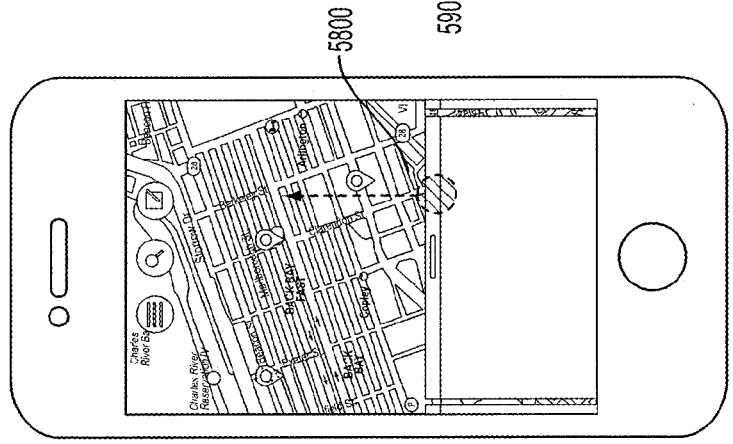
Figure 57:
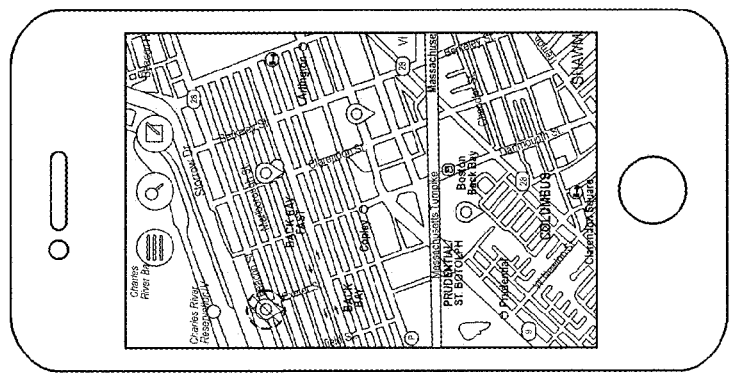

To view drops, upon selecting a drop as indicated by the shaded overlay in FIG. 57 which causes the preview to open as shown in FIG. 58, a user can perform swipe 5800 upwards to snap the drop open fully as shown in FIG. 59. Invoking name 5900 ("Jay Prichet" of the "dropped by" field, who is the person who created the drop) can take the user to that person's user profile. Invoking location 5910 ("Dartmouth & Stuart" of the "dropped at" field, which is where the person dropped the drop) can return search results for that location.

Figure 60:
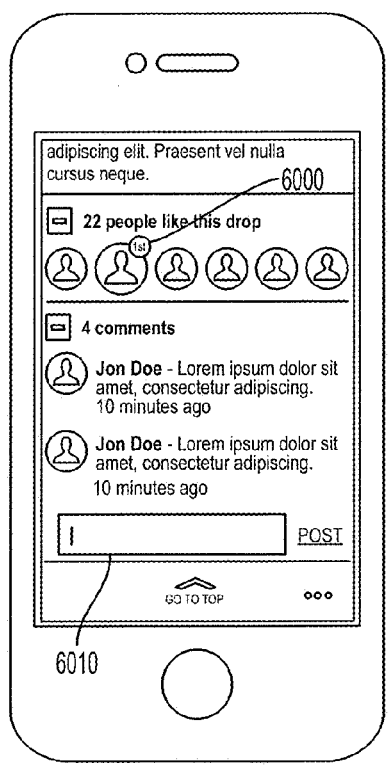
Figure 61:
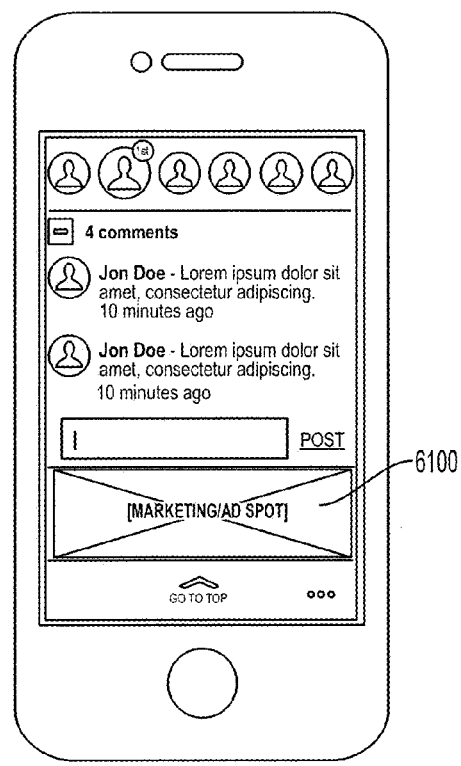

As shown in FIG. 60, users who have favorited a drop can appear in a horizontal scroll. The first person to like it can be flagged with flag 6000. A user can add comments to a drop via comment bar 6010. As shown in FIG. 61, Dropcast can have the ability to insert ad spot 6100 into a drop.

Figure 62:
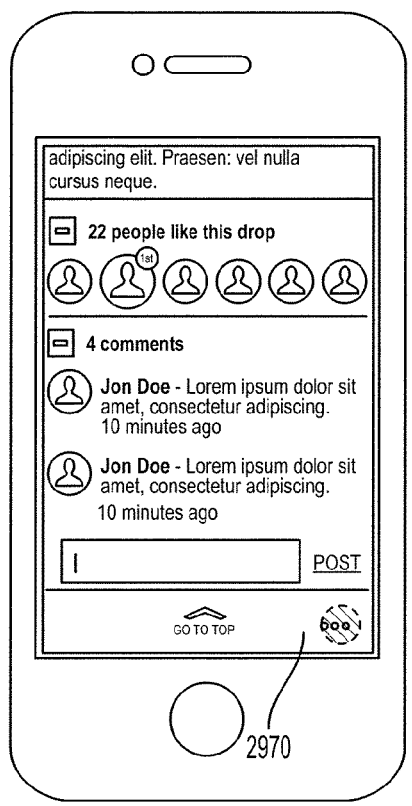
Figure 63:
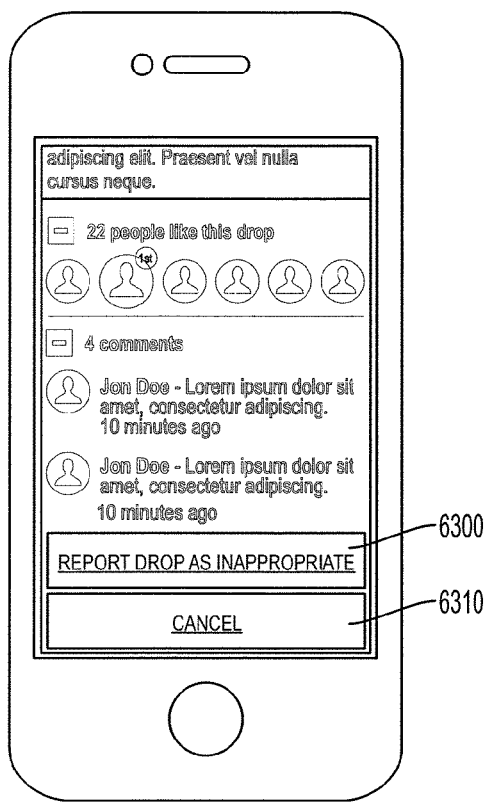

As shown in FIG. 62, invoking report icon 2970 can open the system menu to allow a user to report content as inappropriate. As shown in FIG. 63, a user can report a drop or profile as being inappropriate by invoking button 6300 or the user can cancel the action to return to the previous screen by invoking button 6310.

As shown in FIG. 64, to view media within a drop, a user can tap on media in media panel 6400 in order to open it as indicated by the shaded overlay. As shown in FIG. 65, Media 6510 can open full screen and the user can tap "X" icon 6500 to close the media and return to the drop detail.

Figure 68:
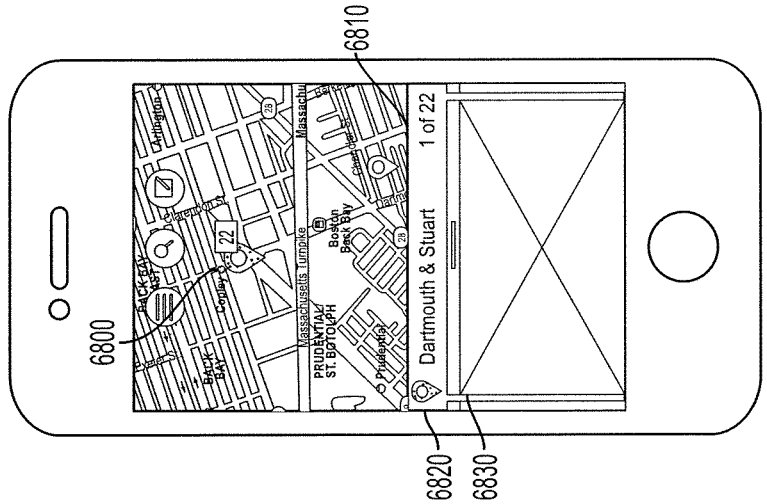
Figure 67:
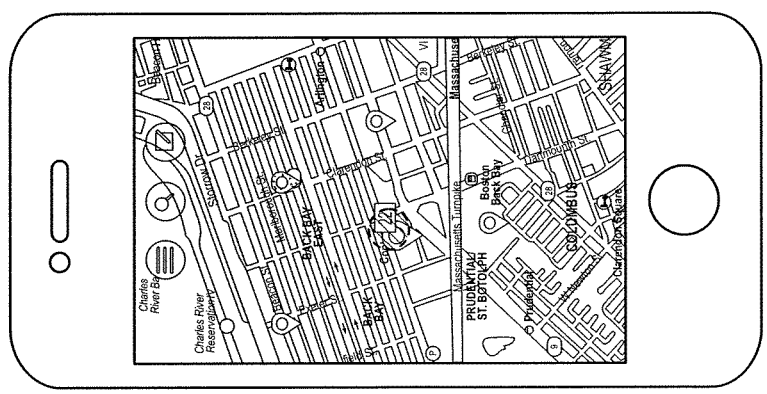
Figure 66:
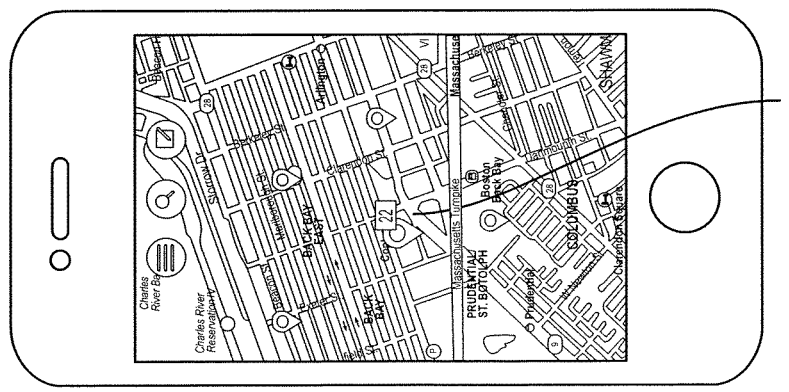

As shown in FIG. 66, when two or more drops are placed in the same location, clustering can occur. The drop icon can appear accompanied with a number to indicate the total number of drops in cluster 6600. Invoking the drop cluster as indicated by the shaded overlay in FIG. 67 can bring up preview list 6830 of those clustered drops as shown in FIG. 68. When the drop cluster is invoked, map 6800 can recenter to that cluster and indicator 6810 can indicate which drop within the cluster is being viewed. Icon 6820 can indicate the location of the clustered drops, and browsing the clustered drops can utilize the same preview functionality as browsing local drops except that the list may only include those drops within the cluster. Closing the cluster preview can unselect that cluster.

Figure 71:
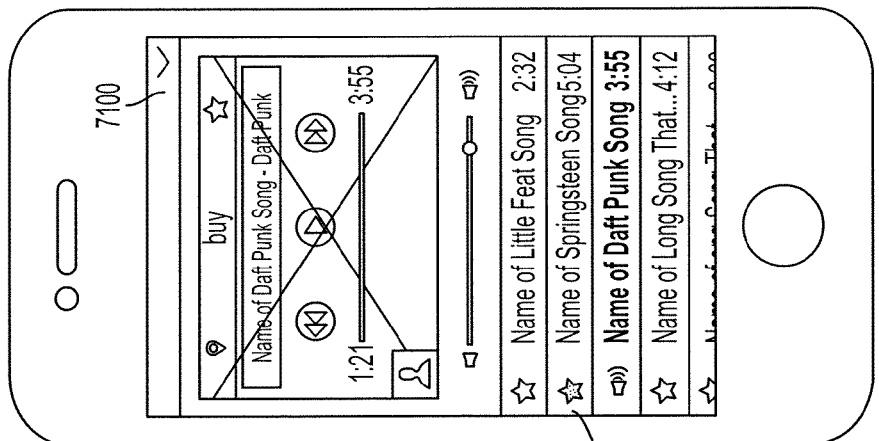
Figure 70:
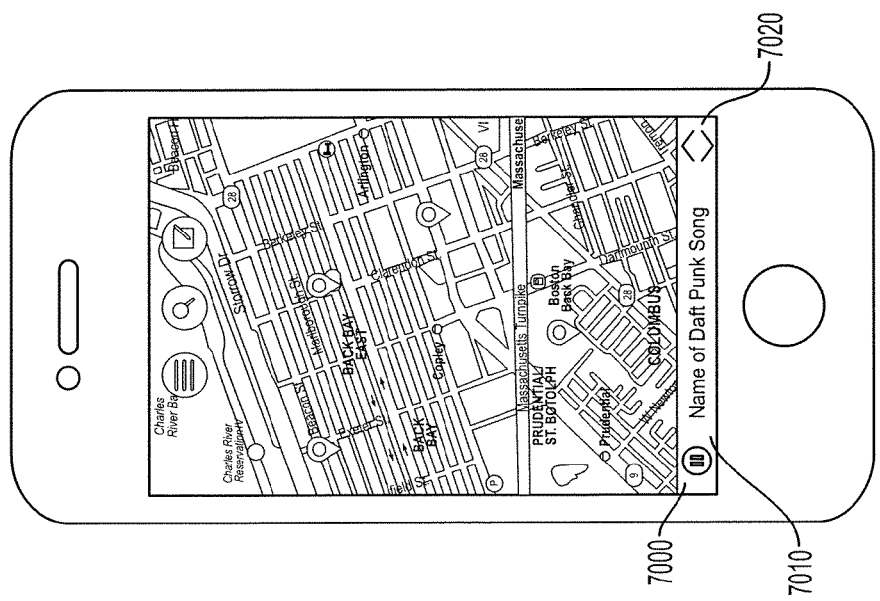
Figure 69:
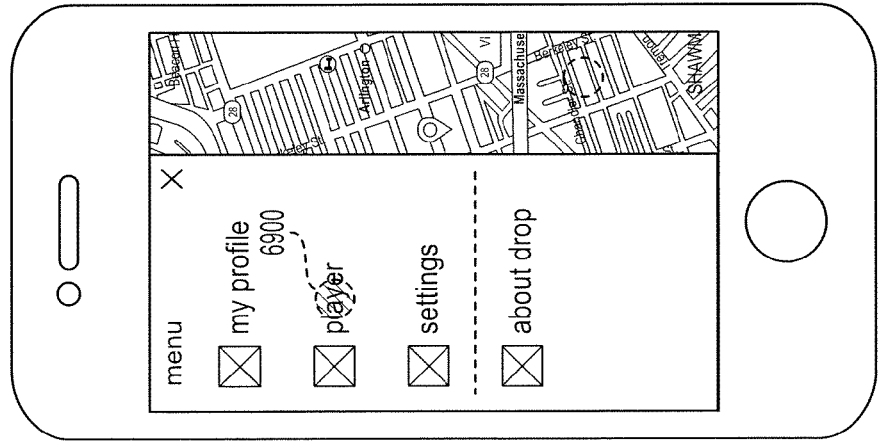

FIGS. 69-74 show examples of a media player provided by mobile client 230. Invoking "player" option 6900 from the menu, as indicated by the shaded overlay in FIG. 69, can bring up a minimized player as shown in FIG. 70. Pause/play button 7000 allows a user to pause/play a song from the minimized player, and the minimized player can display suitable descriptive information such as song title and artist in title bar 7010. The user can also use control 7020 to either open the player to full view as shown in FIG. 71 or close it. If the user does not interact with the player after a suitable number of seconds, the player can collapse again. As shown in FIG. 71, invoking control 7100 can allow the user to close the media player. Unselecting icon 7110 can also remove the corresponding song from the playlist, such that the song will not appear the next time the playlist loads.

Figure 72:
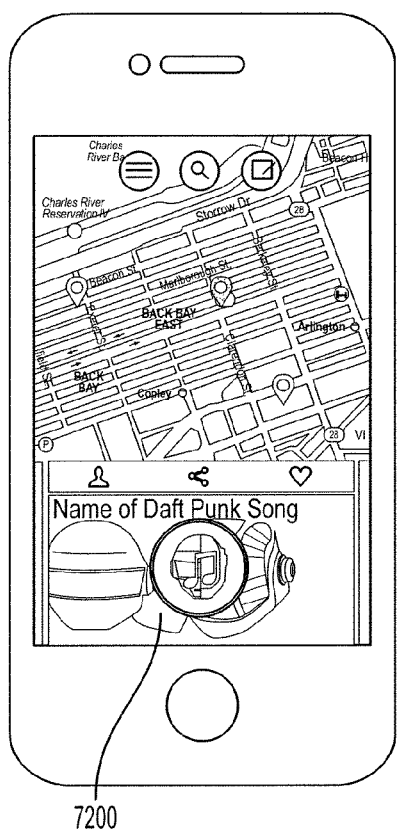
Figure 73:
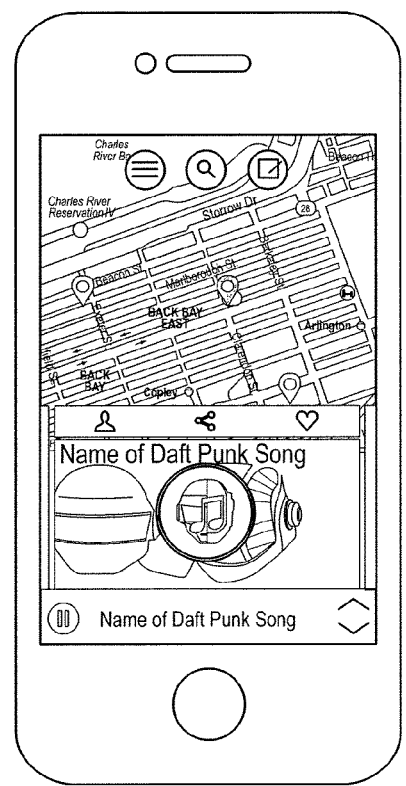

As shown in FIG. 72, when a user plays song 7200 from a drop, the minimized player can automatically appear as shown in FIG. 73. The user can close the drop and the minimized player can remain.

Figure 74:
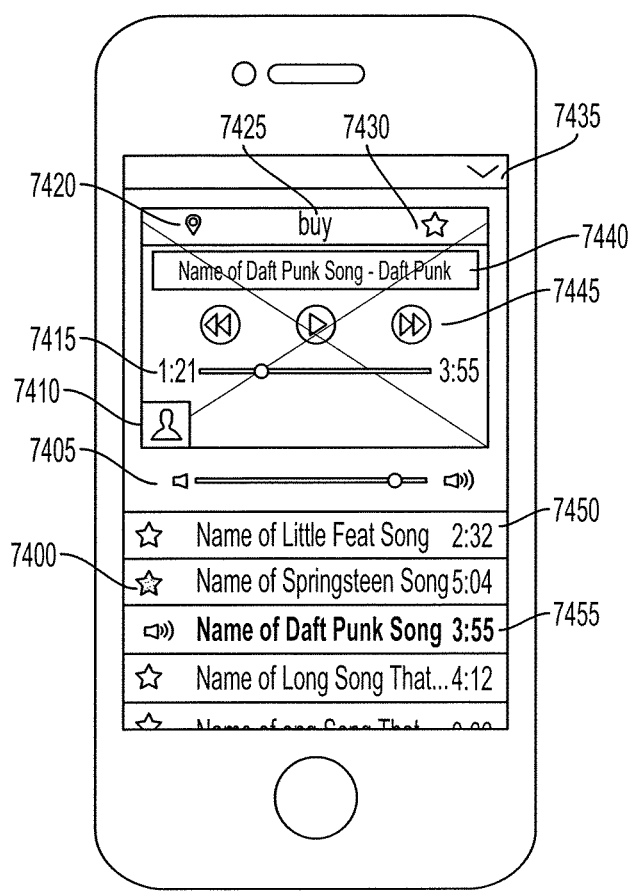

FIG. 74 shows an example of the medial player controls. For example, when icon 7400 is unselected, the song can be removed from the playlist the next time it loads. Control 7405 can control the volume. Invoking icon 7410 can take the user to the artist's profile. Scrubber 7415 can allow the user to jump to a specific point in a song as well as display suitable information such as total song time and time mark for the song. Invoking icon 7420 can take the user to the originating drop. Option 7425 can allow the user to purchase the song. Icon 7430 can select/unselect the song for inclusion in the playlist. Control 7435 can close the media player. Title bar 7440 can display suitable information such as displays, song, title and artist. Player controls 7445 can include rewind, play/pause and fast forward, for example. Only playlist 7450 may be scrollable, and state 7455 (e.g., a different color of text) can indicate the current song being played.

Figure 75:
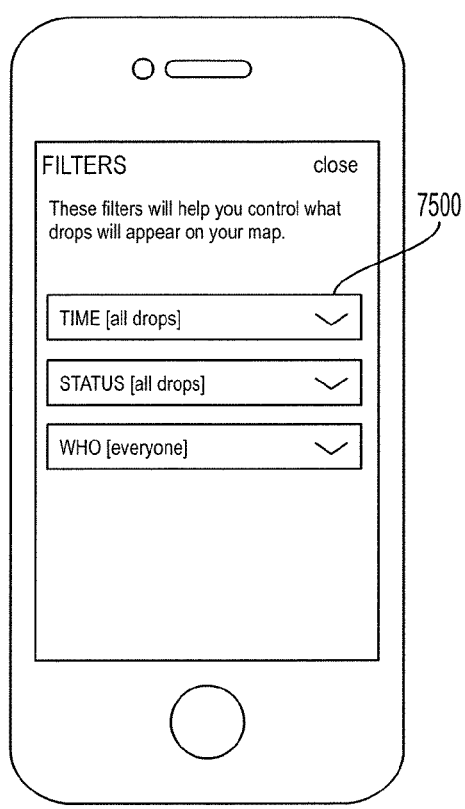

FIGS. 75 and 76 show an example of filtering that can be implemented by mobile client 230. To control what drops appear on the map provided by mobile client 230, filters can be displayed to allow a user to specify constraints in any suitable category such as time ("time"), status ("status") and users ("who") as shown in FIG. 75. For example, the time filter can display drops restricted to the last day, week, month or all drops. The status filter can display drops restricted to drops that are new or all drops. And the users filter can display drops restricted to the user's friends or everyone. Tapping minimized filters such as minimized filter 7500 as shown in FIG. 75 can expand them to show all options as shown by expanded filter 7600 in FIG. 76, for example. "Close" button 7610 can return the user to the map. No save can be required; rather, whatever is selected can be active.

Publishing client 240 of platform 200 can provide user interface functionality similar to that of mobile client 230 as described above. In addition, during drop creation the GPI can also suggest locations based on tags placed in the drop creation steps. These locations can be helpful suggestions based on those tags.

The GPI can have any suitable user type definition, such as super user and single user. A super user can comprise an agency, label and publisher, and a single user can comprise a brand, artist and author.

For example, an agency can comprise an organization that manages ads for other companies and may also have their own presence. A label can comprise an organization that manages drops for multiple artists and may have own presence. A publisher can comprise an organization that manages drops as in a publication. A brand can comprise an organization that advertises through Dropcast and has its own presence. An artist can comprise a content partner that creates drops based on their content, merchandise and events. An author can comprise a content partner that creates drops based on their unique content, not an artist.

With respect to an example GPI user story for an agency super user:
- GPI Super Users have a defined commercial relationship with Dropcast
- Super Users create and manage drops for themselves and other organizations
- Super Users are groups like Agencies, Labels and Publishers The following is an example of a Super User story involving SapientNitro and Its Client List:
- SapientNitro manages the creation of drops for a list of clients
- These clients have their own profiles within Dropcast, but have provided SapientNitro's client team with access
- SapientNitro balances the drops that they are creating against the marketing plan that their clients have in place
- SapientNitro creates drops for Converse
- Converse is currently advertising using the tagline "Shoes are Boring, Wear Sneakers"
- SapientNitro logs in to the GPI system under their own login information
- Within GPI they choose to use the Converse account
- Within the Converse account they create drops that match the location-context messaging of the current campaign and on behalf of the artists and songs that match the campaign
- Once complete, SapientNitro presents staged versions of these drops to Converse for approval
- Converse decides that additional edits are necessary
- SapientNitro goes back into the GPI to manage the drops that were already created and placed in the staging area
- Converse approves the drops based on the edits
- SapientNitro schedules the promotion of these drops to production
- GPI publishes the drops per the schedule to be presented in the mobile app as intended With respect to an example GPI user story for a brand single user:
- GPI Single Users have a defined commercial relationship with Dropcast
- Single Users create and manage drops for themselves
- Single Users are groups like Brands, Bands and Authors/Contributors The following is an example of a Single User story involving Converse:
- Converse creates drops for itself
- Converse has its own profile within Dropcast
- Converse balances the drops that they create against their marketing plan
- Converse is currently advertising using the tagline "Shoes are Boring, Wear Sneakers"
- Converse logs in to the GPI system under their own login information
- Within the Converse account they create drops that match the location-context messaging of the current campaign and on behalf of the artists and songs that match the campaign
- Once complete, Converse reviews staged versions of these drops for approval
- Converse decides that additional edits are necessary
- Converse goes back into the GPI to manage the drops that were already created and placed in the staging area
- Converse approves the drops based on the edits
- Converse schedules the promotion of these drops to production
- GPI publishes the drops per the schedule to be presented in the mobile app as intended With respect to an example GPI user story for a label super user:
- GPI Super Users have a defined commercial relationship with Dropcast
- Super Users create and manage drops for themselves and other organizations
- Super Users are groups like Agencies, Labels and Publishers The following is an example of a Super User story involving Columbia Records and Its Artist List:
- Columbia Records manages the creation of drops for a list of artists
- These Artists have their own profiles within Dropcast, but have provided Columbia Records NR team with access
- Columbia Records balances the drops that they are creating against their artists' marketing plans
- Columbia Records creates drops for One Direction One Direction is currently promoting their new album "Midnight Memories"

Columbia Records NR team logs in to the GPI system under their own login information Within GPI they chose to use the One Direction account Within the One Direction account they create drops that match the location-context messaging of the current campaign, promoting the band and songs from the album Once complete, Columbia Records presents staged versions of these drops to One Direction for approval One Direction decides that additional edits are necessary Columbia Records goes back into the GPI to manage the drops that were already created and placed in the staging area One Direction approves the drops based on the edits Columbia Records schedules the promotion of these drops to production GPI publishes the drops per the schedule to be presented in the mobile app as intended With respect to an example GPI user story for an artist/band single user:

GPI Single Users have a defined commercial relationship with Dropcast

Single Users create and manage drops for themselves

Single Users are groups like Brands, Bands and Authors/Contributors

The following is an example of a Single User story involving Cat Power:

Cat Power creates drops for herself

Cat Power has her own profile within Dropcast

Cat Power balances the drops that she creates against her marketing plan

Cat Power is currently touring to promote her recent album "Sun"

Cat Power logs in to the GPI system under her own login information

Within the Cat Power account she creates drops that match the location-context messaging of the current campaign to promote upcoming performances and releases from the album Once complete, Cat Power reviews staged versions of these drops for approval Cat Power decides that additional edits are necessary Cat Power goes back into the GPI to manage the drops that were already created and placed in the staging area Cat Power approves the drops based on the edits Cat Power schedules the promotion of these drops to production GPI publishes the drops per the schedule to be presented in the mobile app as intended With respect to an example GPI user story for a publisher super user:

GPI Super Users have a defined commercial relationship with Dropcast

Super Users create and manage drops for themselves and other organizations

Super Users are groups like Agencies, Labels and Publishers

The following is an example of a Super User story involving Condé Nast and Its Publications via Wired:

Condé Nast publishes magazines like The New Yorker, Condé Nast Traveler, Wired and Vogue among others.

Mirroring the editorial structure of the organization, Condé Nast and its magazines are able to manage the creation of drops based on the content published.

Each publication has its own profile within Dropcast. As publisher of these magazines, Condé Nast may exert additional control over the editorial content of the drops Condé Nast balances the drops that are created against the marketing and editorial plans of their publications Wired has writers covering SXSWi using Dropcast in its coverage Writers log in to the GPI system under their own login information Within GPI they chose to use the Wired account Within the Wired account they create drops that match the location-context messaging of the SXSWi coverage, connecting content they create to locations in and around Austin, Tex.

Once complete, the Writers present staged versions of these drops to the Wired editorial staff for approval Wired editorial decides that additional edits are necessary The Writers go back into the GPI to manage the drops that were already created and placed in the staging area Wired editorial approves the drops based on the edits Wired schedules the promotion of these drops to production GPI publishes the drops per the schedule to be presented in the mobile app as intended With respect to an example GPI user story for an author single user:

GPI Single Users have a defined commercial relationship with Dropcast

Single Users create and manage drops for themselves

Single Users are groups like Brands, Bands and Authors/Contributors

The following is an example of a Single User story involving Walt Mossburg, a widely respected technology columnist who reviews new technology:

Walt Mossburg creates drops for himself

Walt Mossburg has his own profile within Dropcast

Walt Mossburg balances the drops that he creates against his editorial calendar

Walt Mossburg logs in to the GPI system under his own login information

Figure 77:
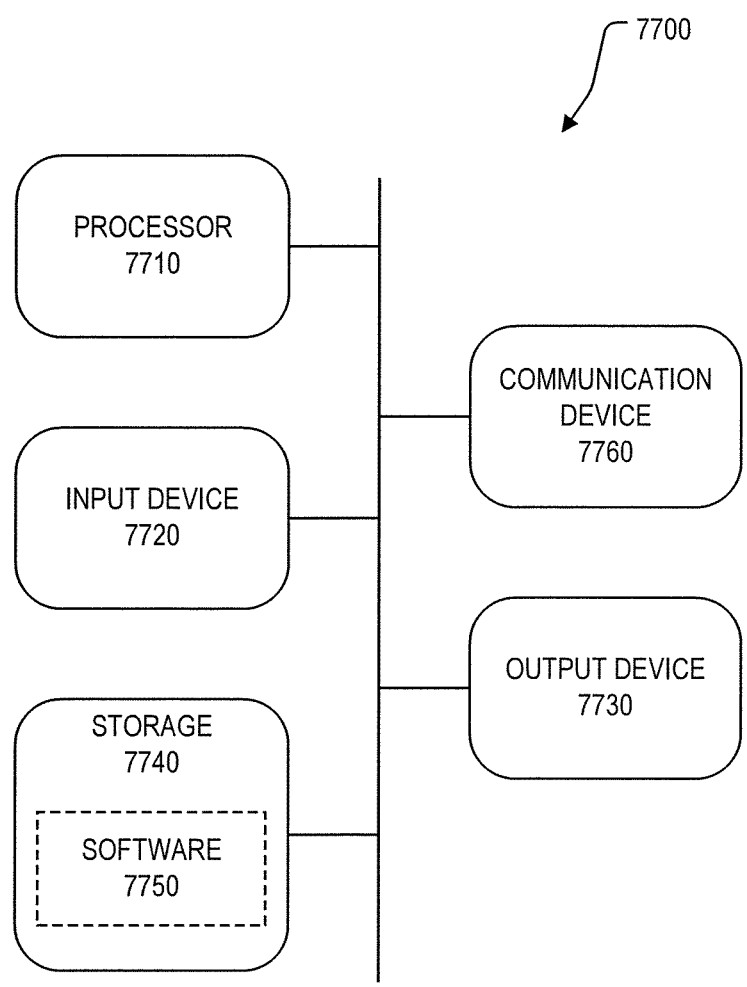
FIG. 77 is a block diagram of an example of a computing device.

Within the Walt Mossburg account he create drops that match location-context content per his editorial calendar Once complete, Walt Mossburg reviews staged versions of these drops for approval Walt Mossburg decides that additional edits are necessary Walt Mossburg goes back into the GPI to manage the drops that were already created and placed in the staging area Walt Mossburg approves the drops based on the edits Walt Mossburg schedules the promotion of these drops to production GPI publishes the drops per the schedule to be presented in the mobile app as intended FIG. 77 shows a block diagram of an example of a computing device, which may generally correspond to server 210, mobile client 230 and publishing client 240. The form of computing device 7700 may be widely varied. For example, computing device 7700 can be a personal computer, workstation, server, handheld computing device, or any other suitable type of microprocessor-based device. Computing device 7700 can include, for example, one or more components including processor 7710, input device 7720, output device 7730, storage 7740, and communication device 7760. These components may be widely varied, and can be connected to each other in any suitable manner, such as via a physical bus, network line or wirelessly for example.

For example, input device 7720 may include a keyboard, mouse, touch screen or monitor, voice-recognition device, or any other suitable device that provides input. Output device 7730 may include, for example, a monitor, printer, disk drive, speakers, or any other suitable device that provides output.

Storage 7740 may include volatile and/or nonvolatile data storage, such as one or more electrical, magnetic or optical memories such as a RAM, cache, hard drive, CD-ROM drive, tape drive or removable storage disk for example. Communication device 7760 may include, for example, a network interface card, modem or any other suitable device capable of transmitting and receiving signals over a network.

The network (not shown) may include any suitable interconnected communication system, such as a local area network (LAN) or wide area network (WAN) for example. The network may implement any suitable communications protocol and may be secured by any suitable security protocol. The corresponding network links may include, for example, telephone lines, DSL, cable networks, T1 or T3 lines, wireless network connections, or any other suitable arrangement that implements the transmission and reception of network signals.

Software 7750 can be stored in storage 7740 and executed by processor 7710, and may include, for example, programming that embodies the functionality described in the various embodiments of the present disclosure. The programming may take any suitable form. Software 7750 may include, for example, a combination of servers such as application servers and database servers.

Software 7750 can also be stored and/or transported within any computer-readable storage medium for use by or in connection with an instruction execution system, apparatus, or device, such as computing device 7700 for example, that can fetch instructions associated with the software from the instruction execution system, apparatus, or device and execute the instructions. In the context of this document, a computer-readable storage medium can be any medium, such as storage 7740 for example, that can contain or store programming for use by or in connection with an instruction execution system, apparatus, or device.

Software 7750 can also be propagated within any transport medium for use by or in connection with an instruction execution system, apparatus, or device, such as computing device 7700 for example, that can fetch instructions associated with the software from the instruction execution system, apparatus, or device and execute the instructions. In the context of this document, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

It will be appreciated that the above description for clarity has described embodiments of the disclosure with reference to different functional units and processors. However, it will be apparent that any suitable distribution of functionality between different functional units or processors may be used without detracting from the disclosure. For example, functionality illustrated to be performed by separate systems may be performed by the same system, and functionality illustrated to be performed by the same system may be performed by separate systems. Hence, references to specific functional units may be seen as references to suitable means for providing the described functionality rather than indicative of a strict logical or physical structure or organization.

The disclosure may be implemented in any suitable form, including hardware, software, firmware, or any combination of these. The disclosure may optionally be implemented partly as computer software running on one or more data processors and/or digital signal processors. The elements and components of an embodiment of the disclosure may be physically, functionally, and logically implemented in any suitable way. Indeed, the functionality may be implemented in a single unit, in a plurality of units, or as part of other functional units. As such, the disclosure may be implemented in a single unit or may be physically and functionally distributed between different units and processors.

One skilled in the relevant art will recognize that many possible modifications and combinations of the disclosed embodiments can be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations can be possible in view of the above teachings. The embodiments were chosen and described to explain the principles of the disclosure and their practical applications, and to enable others skilled in the art to best utilize the disclosure and various embodiments with various modifications as suited to the particular use contemplated.

Further, while this specification contains many specifics, these should not be construed as limitations on the scope of what is being claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method comprising:
    tracking, by a platform implemented by one or more processors, user interaction with one or more packages of multimedia content attached to a digital map, wherein the user interaction comprises a location where the one or more packages are created, a number of the one or more packages opened, or actions taken within the one or more packages, wherein the actions taken within the one or more packages comprise unlocking other packages that were previously invisible to the user;
    receiving, by the platform, a location of the digital map from a user, wherein a plurality of packages of multimedia content are attached to the location of the digital map; and
    filtering, by the platform, the plurality of packages of multimedia content to select packages to be displayed to the user based on the user interaction and the location of the digital map received from the user.

2. The method of claim 1, wherein the user interaction comprises a number of the one or more packages created.

3. The method of claim 1, wherein the actions taken within the one or more packages comprises sharing a package of the one or more packages.

4. The method of claim 1, wherein the user interaction comprises comments made within the one or more packages.

5. The method of claim 1, wherein the user interaction comprises purchases made via the one or more packages.

6. The method of claim 1, wherein the location of the digital map is a location of the digital map selected by the user.

7. The method of claim 1, wherein the location of the digital map is the location of the user.

8. The method of claim 1, wherein a package of the plurality of packages of multimedia content is attached to the location of the digital map by a user action associating the package with the location.

9. The method of claim 1, wherein a package of the plurality of packages of multimedia content is automatically attached to the location of the digital map by the platform.

10. The method of claim 9, wherein the platform automatically attaches the package to the location of the digital map based on extracting context related to the location from the package.

11. The method of claim 1, wherein the plurality of packages of multimedia content comprise text, images, video or audio.

12. The method of claim 1, wherein tracking user interaction with one or more packages of multimedia content attached to a digital map comprises tracking interaction of multiple users with at least one of the one or more packages of multimedia content.

\* \* \* \* \*